(12) United States Patent
Peumans et al.

(10) Patent No.: US 10,845,310 B2
(45) Date of Patent: Nov. 24, 2020

(54) QUANTIFICATION OF TOPOLOGICALLY ARRANGED LUMINESCENT DYES

(71) Applicant: IMEC VZW, Leuven (BE)

(72) Inventors: Peter Peumans, Herfelingen (BE); Liesbet Lagae, Leuven (BE); Willem Van Roy, Bierbeek (BE); Tim Stakenborg, Heverlee (BE); Pol Van Dorpe, Spalbeek (BE)

(73) Assignee: IMEC VZW, Leuven (BE)

( * ) Notice: Subject to any disclaimer, the term of this patent is extended or adjusted under 35 U.S.C. 154(b) by 97 days.

(21) Appl. No.: 15/737,747

(22) PCT Filed: Jun. 29, 2016

(86) PCT No.: PCT/EP2016/065219
§ 371 (c)(1),
(2) Date: Dec. 18, 2017

(87) PCT Pub. No.: WO2017/001526
PCT Pub. Date: Jan. 5, 2017

(65) Prior Publication Data
US 2018/0188176 A1    Jul. 5, 2018

(30) Foreign Application Priority Data
Jun. 30, 2015   (EP) .................................. 15174700

(51) Int. Cl.
*G01N 21/64* (2006.01)
*G01N 21/17* (2006.01)

(52) U.S. Cl.
CPC ..... *G01N 21/6452* (2013.01); *G01N 21/1717* (2013.01); *G01N 21/648* (2013.01);
(Continued)

(58) Field of Classification Search
None
See application file for complete search history.

(56) References Cited

U.S. PATENT DOCUMENTS

| 6,362,832 B1 | 3/2002 | Stephan et al. |
| 7,863,036 B2 | 1/2011 | Pouteau et al. |

(Continued)

FOREIGN PATENT DOCUMENTS

| EP | 1 347 285 A1 | 9/2003 |
| EP | 1 548 423 A1 | 6/2005 |

OTHER PUBLICATIONS

Marriott et al., "Optical lock-in detection imaging microscopy for contrast-enhanced imaging in living cells", PNAS, vol. 105, No. 46, pp. 17789-17794, Nov. 18, 2008. (Year: 2008).*

(Continued)

*Primary Examiner* — Rebecca M Giere
(74) *Attorney, Agent, or Firm* — McDonnell Boehnen Hulbert & Berghoff LLP

(57) ABSTRACT

A sensor device for quantifying luminescent targets configured in an at least one dimensional pattern. The sensor device comprises a detector for obtaining an at least one dimensional pattern of measured signals, wherein the detector is adapted for detecting the luminescence of the luminescent targets, resulting in a measured pattern. The sensor device moreover comprises a processor configured to correlate the measured pattern with at least one reference pattern, so as to generate a measurement signal representative for the quantification of luminescent targets. The at least one reference pattern is a recorded pattern or an expected pattern. A recorded pattern is a pattern which is obtained by the detector before the measured pattern is obtained.

8 Claims, 14 Drawing Sheets

(52) U.S. Cl.
CPC ..... *G01N 21/6428* (2013.01); *G01N 21/6456* (2013.01); *G01N 2021/1731* (2013.01); *G01N 2021/6421* (2013.01); *G01N 2021/6432* (2013.01); *G01N 2021/6439* (2013.01)

(56) References Cited

U.S. PATENT DOCUMENTS

| | | | |
|---|---|---|---|
| 2005/0048599 A1* | 3/2005 | Goldberg | B82Y 5/00 435/34 |
| 2011/0278471 A1* | 11/2011 | Hoshishima | G01N 15/1429 250/459.1 |
| 2014/0106989 A1 | 4/2014 | Barich et al. | |

OTHER PUBLICATIONS

PCT International Search Report and Written Opinion, PCT International Application No. PCT/EP2016/065219, dated Dec. 15, 2016, 18 pages.

\* cited by examiner

QUANTIFICATION OF TOPOLOGICALLY ARRANGED LUMINESCENT DYES

CROSS-REFERENCE TO RELATED APPLICATION

The present application is a national stage entry of PCT/EP2016/065219 filed Jun. 29, 2016, which claims priority to European Patent Application No. 15174700.3 filed Jun. 30, 2015, the contents of which are hereby incorporated by reference.

FIELD OF THE DISCLOSURE

The present disclosure relates to the field of sensors, more particularly for instance biosensors. More specifically it relates to sensors making use of luminescence for quantifying a component in a solution.

Background

Affinity based bio-sensors use an affinity probe which specifically binds to a target molecule. The target molecule is the molecule which comprises or consists of the analyte molecule that needs to be quantified. In affinity based bio-sensors the binding event is detected by a transduction scheme. This can be a direct detection of the binding event (e.g. in a label free sensor), or it may be an indirect chain of interactions that can be detected. In the last case a second probe with a label allows to obtain e.g. an optical or electrochemical signal representative for the amount of analyte being present. The label may for example be a fluorophore or an enzyme that catalyzes still another reaction that for example provides an optical or electrochemical signal.

In affinity based bio-sensors with fluorescence signal transduction, a bulk sample is sent over a surface, and the target molecule (analyte) is bound by an affinity probe on the surface. The presence of target molecules on the surface is thereby correlated with the presence of labels on the surface. These labels may for example be fluorescent. In such bio-sensors the fluorescent light is captured and its intensity is a measure for the amount of analyte molecules present in the original bulk sample. The affinity probe may for example be an antibody, an antigen, an aptamer, complementary DNA or a molecularly imprinted surface. In the affinity based fluorescent bio-sensor with evanescent excitation fluorescence, total internal reflection may be used to create an evanescent field very close to the sensor surface, to excite only those fluorophores which are present very close to the surface, and of a large fraction of which can be expected that they are bound to an affinity probe on the surface.

Despite the already existing affinity based sensors there is still room for building improved affinity based sensors.

SUMMARY

It is an object of embodiments of the present disclosure to provide optical detection systems with a good, e.g. an improved, signal to noise ratio. It is an objective of embodiments of the present disclosure to be able to separate the desired signal from background signal(s).

The above objective is accomplished by a method and device according to embodiments of the present disclosure.

In a first aspect, the present disclosure provides a sensor device for quantifying luminescent targets configured in an at least one dimensional pattern. The sensor device comprises:

a detector for obtaining an at least one-dimensional pattern of measured signals, wherein the detector is adapted for detecting the luminescence of the luminescent targets, resulting in a measured pattern, and a processor configured to correlate the measured pattern with at least one reference pattern so as to generate a measurement signal representative for the quantification of luminescent targets, wherein the at least one reference pattern is an expected pattern or a recorded pattern obtained by the detector before the measured pattern is obtained.

In embodiments of the present disclosure the measured pattern comprises desired signals originating from the luminescent targets and background signals. In example embodiments of the present disclosure, the signal to noise ratio can be increased by correlating the measured pattern with at least one reference pattern. In example embodiments of the present disclosure, the rejection of background signals is improved by correlating the measured pattern with at least one reference pattern. In example embodiments of the present disclosure, mobile sources of background (moving spots) can be attenuated. This can be done by correlating the measured pattern with a reference pattern wherein the reference pattern is a recorded pattern.

A sensor device according to embodiments of the present disclosure may comprise a surface for binding the luminescent targets, wherein the surface is designed such that the luminescent targets bind on a location of the surface corresponding with an at least one-dimensional binding pattern and wherein the at least one reference pattern is the at least one-dimensional binding pattern of the surface.

In example embodiments of the present disclosure, the measured pattern correlates with the reference pattern (i.e. when both are aligned, a peak in the correlation is obtained). In example embodiments of the present disclosure, the background does not show any correlation with the reference pattern (i.e. the value of the correlation is independent of the offset between the background and the reference pattern).

A sensor device according to embodiments of the present disclosure may comprise a surface for binding the luminescent targets, and an evanescent field generating structure, wherein the light source is coupled to the evanescent field generating structure and wherein the evanescent field generating structure is adapted for generating an evanescent field at the surface.

In example embodiments of the present disclosure, the luminescent targets which should be quantified, are bound to the surface of the device and that substantially only the surface of the device is illuminated by the light source. By substantially only illuminating the surface, the background signal can be reduced, thus increasing the signal to noise ratio.

In a sensor device according to embodiments of the present disclosure, the processor is configured to correlate subsections of the measured pattern with subsections of the reference pattern. In example embodiments of the present disclosure, a mobile background generator can be better identified and localized. In example embodiments of the present disclosure, the utilized processing power is reduced by focusing on subsections of the measured pattern and of the reference pattern.

A sensor device according to embodiments of the present disclosure may comprise a modulator which is configured to modulate a physical parameter, resulting in modulation of a desired signal that is different from the modulation of a background signal, wherein the desired signal is this part of the pattern of measured signals that is originating from the luminescent targets, and wherein the background signal is anything but the desired signal in the pattern of measured signals. The processor may be configured to correlate, while taking into account the modulation of the physical parameter, the measured pattern with the at least one reference pattern recorded at a different time instance than the measured pattern. In example embodiments of the present disclosure, the signal to noise ratio can be increased. In example embodiments of the present disclosure, the signal to noise ratio can be increased by correlating the measured change (the difference between the reference pattern and the measured pattern) with the expected change (caused by the modulation).

A sensor device according to embodiments of the present disclosure may comprise a light source configured to excite the luminescent targets at two different wavelengths, and the recorded pattern may be obtained when exciting at one wavelength and the measured pattern may be obtained when exciting at the other wavelength. In example embodiments of the present disclosure, by correlating both measured patterns, sources of background can be reduced or eliminated. This especially holds for sources of background which have a different frequency characteristic than the luminescent targets.

A sensor device according to embodiments of the present disclosure may comprise
  a light source for exciting the luminescent targets, thus generating luminescence signals, and
  a bleaching device for bleaching of at least part of the sources generating the background signal, wherein a desired signal is this part of the pattern of measured signals that is originating from the luminescent targets, and wherein the background signal is anything but the desired signal in the pattern of measured signals.

The processor may be configured to trigger the bleaching device to start bleaching at a moment in time after substantial saturation of the background signal and before saturation of the desired signal, and to trigger the light source for exciting the remaining luminescent targets, wherein the remaining luminescent targets are those targets which are not bleached, and to trigger the detector for detecting the luminescence signal of the remaining luminescent targets, so as to generate a measurement signal representative for the quantification of the luminescent targets.

In example embodiments of the present disclosure, the background contributing sources, of which the background signal is substantially saturated, are bleached during the bleaching step. In example embodiments of the present disclosure, the luminescent sources of background tend to build up faster in the sensor device. The bleached luminescent sources of background are occupying the places in the sensor device and they do not generate a background signal anymore. This results in a permanently decreased background signal after the bleaching. Since the bleaching step is applied before saturation of the desired signal, build-up of the desired signal continues after the bleaching step with the remaining luminescent (non-bleached) targets. After the bleaching an excitation signal is generated which triggers the luminescent targets, which were not subject to the bleaching and which are bound in the sensor device after applying the bleaching, to generate a luminescent signal. By generating the bleaching after the background signal saturates and before the desired signal saturates, places are free in the sensor device to which the luminescent targets can bind whereas no spaces are present where the luminescent sources of background can bind. In example embodiments of the present disclosure, no selective bleaching is required. Any luminescent sources may be bleached during the bleaching step. In example embodiments of the present disclosure, any background contributing luminescent sources, which are present during the bleaching of the luminescent targets, are also bleached.

In a second aspect, the present disclosure provides a diagnostic device comprising a sensor device according to embodiments of the first aspect of the present disclosure, for sensing an analyte and generating a sensing signal, and an output unit for providing an output of said sensor device on which a diagnose can be based. The output unit may be adapted for outputting a signal representative for presence/absence or concentration of the analyte.

In a second aspect, the present disclosure provides a method for quantifying luminescent targets configured in an at least one-dimensional pattern. The method comprises:
  obtaining an at least one-dimensional pattern of measured signals, using a detector wherein the detector is adapted for detecting the luminescence of the luminescent targets, resulting in a measured pattern,
  correlating the measured pattern with at least one reference pattern thus obtaining a quantification of the luminescent targets, wherein the reference pattern is a recorded pattern or an expected pattern, and wherein a recorded pattern is a pattern which is obtained by the detector before the measured pattern is obtained.

In a method according to embodiments of the present disclosure, a pattern may be measured at regular time intervals and correlated with the recorded pattern. In example embodiments of the present disclosure, signals which have a long decay time can be distinguished from signals having a shorter decay time.

A method according to embodiments of the present disclosure may comprise:
  providing a surface which is designed such that the luminescent targets bind on locations corresponding with an at least one dimensional pattern,
  correlating the measured pattern with the reference pattern wherein the reference pattern is the at least one dimensional pattern designed on the surface.

In example embodiments of the present disclosure, the reference pattern is an expected pattern, namely the at least one dimensional pattern designed on the surface. This increases the ease of computation of correlations. It avoids that the noise that would be present on the reference pattern when a recorded pattern would be used as a reference pattern.

In the correlating step of a method according to embodiments of the present disclosure, subsections of the measured pattern may be correlated with subsections of the reference pattern.

A method according to embodiments of the present disclosure may comprise:
  modulating a physical parameter, resulting in a modulation of a desired signal that is different from the modulation of a background signal, wherein the desired signal is this part of the pattern of measured signals that is originating from the luminescent targets, and wherein the background signal is anything but the desired signal in the pattern of measured signals,
  exciting the target using a light source, and
  correlating the measured pattern with the at least one reference pattern, taking into account the modulation of the physical parameter, wherein the reference pattern is a pattern recorded at a different time instance as the measured pattern.

A method according to embodiments of the present disclosure may comprise:
exciting the luminescent targets at a first excitation wavelength,
measuring the recorded pattern at a first detection wavelength,
exciting the luminescent targets at a second excitation wavelength different from the first excitation wavelength, and
measuring the measured pattern at a second detection wavelength.

In embodiments of the present disclosure, the first and the second detection wavelengths might be the same.

A method according to embodiments of the present disclosure may comprise:
bleaching the luminescent targets and at least part of the sources generating the background signal, wherein a desired signal is this part of the pattern of measured signals that is originating from the luminescent targets, and wherein the background signal is anything but the desired signal in the pattern of measured signals,
measuring the reference pattern,
exciting the luminescent targets, and
measuring the measured pattern.

Particular aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

Figure 1:
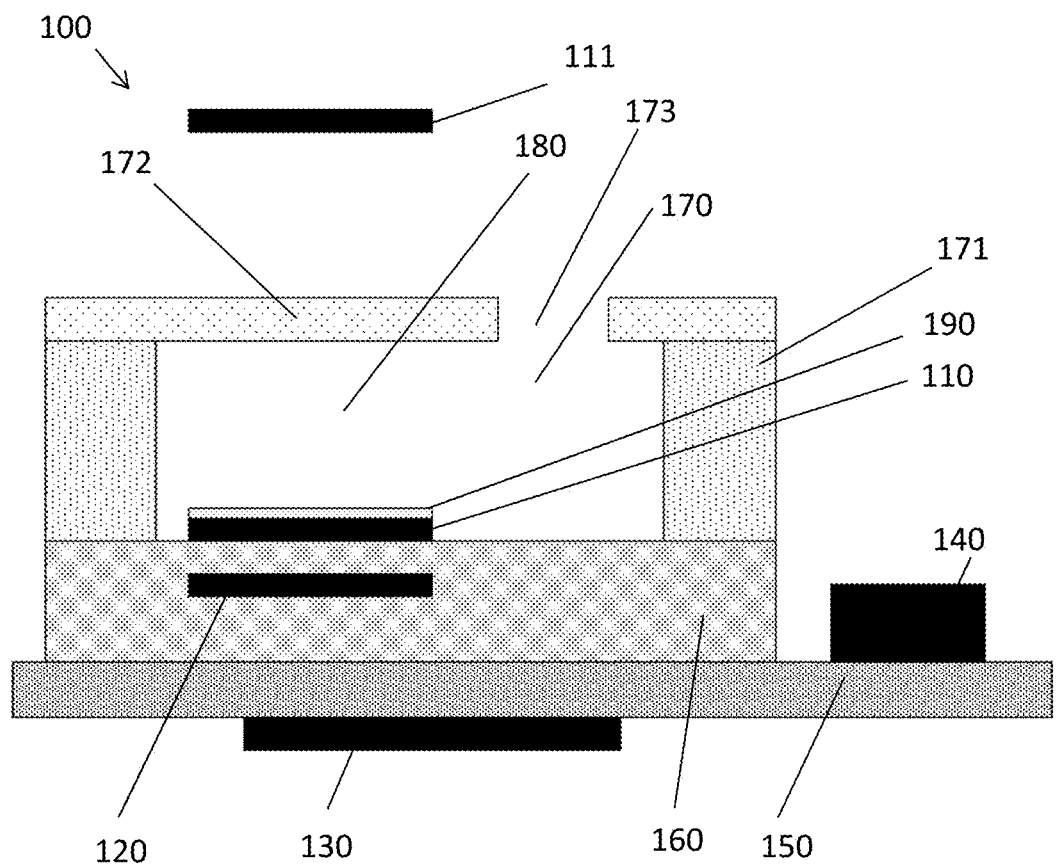
FIG. 1 is a schematic drawing of a sensor device in accordance with example embodiments.

The drawings are only schematic and are non-limiting. In the drawings, the size of some of the elements may be exaggerated and not drawn on scale for illustrative purposes.

Any reference signs in the claims shall not be construed as limiting the scope. In the different drawings, the same reference signs refer to the same or analogous elements.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, under and the like in the description and the claims are used for descriptive purposes and not necessarily for describing relative positions. It is to be understood the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

As used herein and unless provided otherwise, the term "analyte" or "target" refers to the substance to be measured, the substance having or not having a biological origin. By the expression "substance having a biological origin", we intend to mean a substance that is present or produced in a living organism. Particularly, the substance may be a biomolecule. For instance, the analyte may be a protein or an antigen. The analyte may or may not be labelled for detection. In the context of the present disclosure, the terms target and analyte are considered to be synonyms.

By the term "biomolecule" is meant any molecule that is present in living organisms, including large macromolecules such as proteins, polysaccharides, lipids, and nucleic acids, as well as small molecules, such as primary metabolites, secondary metabolites, and natural products. The term "biomolecule" also encompasses molecules with similar properties and/or structure and/or composition, but that have been manufactured artificially rather than in a living organism.

Where in embodiments of the present disclosure reference is made to a "recorded pattern", reference is made to a pattern of measured signals which was detected at a time instance before the actual time instance at which the measured pattern is used.

Where in embodiments of the present disclosure reference is made to the modulation dependency of the desired signal or of the background signal, reference is made to the dependency of the desired signal on the modulation of the physical parameter or to the dependency of the background signal on the modulation of the physical parameter.

Where in embodiments of the present disclosure reference is made to a "luminescent target", reference is made to a target which may be luminescent by itself or to a target which may be labelled with a luminescent (e.g. fluorescent) label.

Where in embodiments of the present disclosure reference is made to "luminescence of a target", reference is made to emission of light by the target, not resulting from thermal emission. Typically, in the context of the present disclosure, luminescence will be photoluminescence, generated by absorption of photons; such as fluorescence or phosphorescence. The present disclosure, however, is not limited to this type of luminescence, and can also be applied in case of, for instance, bioluminescence or chemiluminescence (emission as a result of a (bio)chemical reaction by an organism) or electroluminescence (a result of an electric current passed through the target).

Where in embodiments of the present disclosure reference is made to the "brightness" of a luminescent centre, reference is made to the strength of the luminescent response to the excitation light. For a fluorophore the brightness is the product of the absorption coefficient (e.g., which fraction of the light is absorbed) and the quantum efficiency (e.g., which fraction of the absorbed light gives rise to the emission of a fluorescent photon). For a scattering centre the brightness describes which fraction of the light is scattered.

Where in embodiments of the present disclosure reference is made to the "background signal", reference is made to any signal which is disturbing the measurement of the desired signal. This may comprise background signals from luminescent sources which do not form part of the target under study. This may comprise luminescence which is scattered by scattering centres in the device. This may comprise any other noise source which is present in the device.

Where in embodiments of the present disclosure reference is made to "quantifying luminescent targets", reference is made to either determining the presence of luminescent targets, or determining the amount of luminescent targets, or determining the concentration of luminescent targets.

In embodiments of the present disclosure the pattern of the measured signals can be decomposed into a pattern of desired signals and a pattern of background signals. The pattern of desired signals is this part of the pattern of measured signals that is originating from the luminescent targets. The pattern of background signals is anything but the pattern of desired signals in the pattern of measured signals.

Where in embodiments of the present disclosure reference is made to "a desired pattern", reference is made to a pattern of desired signals.

Where in embodiments of the present disclosure reference is made to "a background pattern", reference is made to a pattern of background signals.

In a first aspect, the present disclosure provides a device 100 for quantifying targets (analyte) which may be present in a fluid sample, e.g. in a biological fluid such as a blood sample, a urine sample, a drop of saliva, sperm. One embodiment of such device 100 is schematically illustrated in FIG. 1. Devices according to embodiments of the present disclosure may comprise a microfluidic channel 170 for guiding the sample towards a cavity 180 in or on a substrate 160, for instance a semiconductor substrate such as e.g. a silicon substrate or a transparent substrate such as e.g. a glass substrate. The microfluidic channel 170 and/or the cavity 180 may have sidewalls 171 and top 172, inlet(s) and/or outlet(s) 173. These sidewalls 171, 172 and/or inlets/outlets 173 may be transparent or opaque. The cavity 180 and the microfluidic channel 170 may be the same. The cavity 180 may comprise a surface 190 on which affinity probes may be present for capturing the target molecule. In embodiments of the present disclosure the analyte may be luminescent (e.g. fluorescent) itself or it may be labelled with a luminescent label.

In embodiments of the present disclosure the sample may be injected in the device as a one-time event (e.g. filling a reservoir) or the injection may be a continuous event (e.g. triggered by starting a flow) that continues during the subsequent steps when quantifying the targets.

In embodiments of the present disclosure the luminescent targets may be illuminated through (regular) free space illumination or through evanescent illumination. In free space illumination light source 111 is illuminating at least the surface 190 with the affinity probes. The light source 111 may be located at the top (the top wall 172 and any other layer between the light source 111 and the cavity 180 should be transparent) or bottom (the substrate 160 and any other layer between the light source 111 and the cavity 180 should be transparent) of the sensor device 100. The light source 111 may be, amongst others, a laser, a laser diode, a VCSEL, a LED, a lamp, a Tungsten lamp, a Halogen lamp, a Mercury lamp, a Xenon lamp, a Metal Halide lamp. In embodiments of the present disclosure the light coming from the light source 111 may be projected or focused by lenses or mirrors or a microscope or optical fibres on the surface 190. (In this case no evanescent field generating structure 110—see below—is present).

In case of evanescent illumination, devices according to embodiments of the present disclosure comprise an evanescent field generating structure 110 for generating an evanescent field at the surface 190.

The evanescent field generating structure 110 may be integrated in or on the substrate 160 or it may be separate from the substrate 160 (e.g. against the microfluidic channel top 172 or sidewalls 171). In embodiments of the present disclosure the light of the light source 111 may be guided towards the cavity 180 using a connecting structure 112 such as an optical waveguide. The light may be coupled to the evanescent field generating structure 110 or to the connecting structure 112 using any suitable optical device, such as for instance a grating coupler or a butt coupler.

In embodiments of the present disclosure the light source 111 may be integrated in the substrate 160. In case of close integration with the rest of the device 100, the light source 111 may be, amongst others, a laser, a laser diode, a VCSEL, a LED. These light sources may be applied in the case of evanescent excitation.

In case the light source 111 is not necessarily closely integrated with the rest of the device 100 it may also be a laser, a lamp, a Tungsten lamp, a Halogen lamp, a Mercury lamp, a Xenon lamp, a Metal Halide lamp. This type of light source can also be applied in the case of evanescent excitation.

Devices 100 according to embodiments of the present disclosure moreover comprise a detector 120 which can detect the luminescence of the luminescent target after the target has been excited with the evanescent field generating structure 110 or light source 111. The measured signal is composed of a desired signal which originates from the luminescent targets and a background signal emanating from other luminescent sources present in the system. The detector 120 may be a multi-pixel detector for imaging the surface 190 of the device 100. The detector 120 may be, amongst others, an imager, a line detector, a CMOS detector, a CCD detector, a(n array of) photodiode(s), an (array of) avalanche photodiode(s), a(n array of) photomultiplier tube(s) PMT(s). The detector 120 may be located external to the cavity 180 (not integrated in/in physical contact with either substrate 160 or top 172). In that case at least one top or bottom wall (e.g. walls from the microfluidic channel 171, 172, substrate 160, any other layer) should be transparent such that the luminescence signals from the luminescent targets can exit from the cavity through this wall. In case the detector is located external to the cavity additional lenses, as used in classical optics, may be applied for guiding the luminescence signals towards the detector.

In embodiments of the present disclosure the detector 120 may be integrated with the cavity 180. It may be present at the top or at the bottom of the cavity. The bottom side is the side where the target molecules bind to the affinity probes, the top side is the opposite side thereof. The detector 120 may be present on the inside or the outside of the cavity. When the detector 120 is present on the outside of the cavity, a transparent wall of the cavity may be provided.

In embodiments of the present disclosure luminescence from the luminescent targets may be collected by a waveguide connected to the detector 120. This waveguide may be the same as the excitation waveguide (e.g., connecting structure 1121 or it may be a different waveguide. The luminescent light may be coupled from the waveguide into the detector 120 the same way as the light coming from the light source is coupled into the waveguide (e.g. through a grating coupler, butt coupling etc.). This may be the same coupler as the input coupler, if it has enough bandwidth and if incoming and outgoing light is handled appropriately, or it may be a different coupler. In embodiments of the present disclosure the input coupler and the output coupler are different. In embodiments of the present disclosure diffraction and/or reflection optics may be present between the waveguide and the detector. This may for example be a lens to project the output couplers onto the detector. Filters may be present, in, on or before the detector, for attenuating light which is outside the frequency range of the light generated by the luminescent targets. The detector 120 may be a CMOS imager.

Sensor devices 100 according to embodiments of the present disclosure comprise a detector 120 for detecting the luminescence of the luminescent targets resulting in at least a one dimensional pattern of the measured signals.

The sensor device 100 moreover comprises a processor 140 configured to correlate the measured pattern with at least one reference pattern. The reference pattern may be a recorded pattern or an expected pattern. The pattern of the measured signals can be decomposed into a pattern of desired signals (the desired pattern) and a pattern of background signals (the background pattern).

The term processor 140 should be interpreted widely. It can be a microprocessor but it can for example also be an ASIC (application specific integrated circuit) or an FPGA (field programmable gate array), or an analog or digital signal processing device. The processing may be distributed. It may for example be partly or completely running on an external device (e.g. a smartphone). The external device, e.g.

smartphone, may for example receive raw data (digitized output of the detector) or it may receive already pre-treated data.

A device 100 according to embodiments of the present disclosure may be present on a printed circuit board 150. It may comprise a needle or a suction element like a cotton strip (not illustrated) and a microfluidic channel 170 for taking or receiving a fluid sample and guiding it to the surface 190. In example embodiments of the present disclosure, the different features associated with executing the steps for analyzing a fluid sample may be integrated in one and the same device 100.

Depending on the embodiment, the fluidics of the device 100 can be different. They can for example be capillary and/or they can be pressure driven, e.g. pumped. Pumps can for example control the pressure or the volumetric flow rate. The microfluidic channel 170 can be an open channel or a closed channel. A schematic drawing of a device 100 in accordance with embodiments of the present disclosure and comprising the features as described above is shown in FIG. 1.

The size of the device 100, in accordance with embodiments of the present disclosure, is limited. The size may for example be comparable to the size of an SD-card or of a micro-SD card or of a USB-stick.

Embodiments of the present disclosure can for example be used to check if certain biomarkers are present in the fluid (e.g. presence of antibodies against HIV in a blood sample).

In embodiments of the present disclosure the background signal may have different origins. Luminescent sources may be present which are not linked with the analyte, hence which do not form part of target molecules. These will, nevertheless, be detected by the detector 120 and will increase the background signal of the device 100.

In embodiments of the present disclosure the slope of the intensity of the desired signal vs time is determined by the binding rate of the targets to the surface 190.

Figure 2:
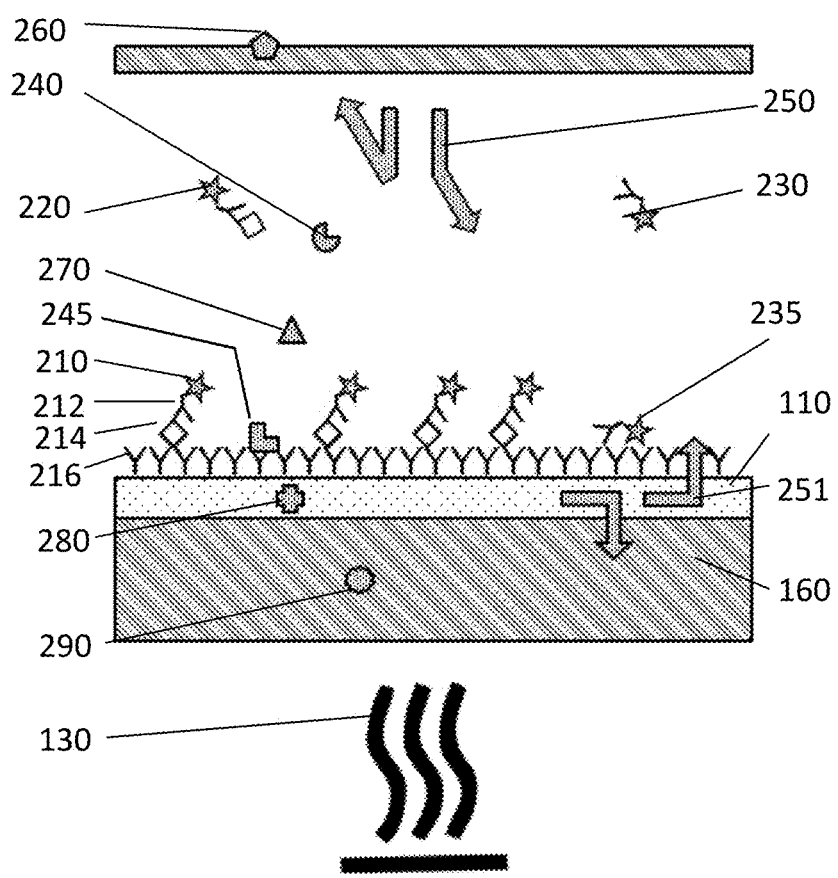
FIG. 2 is a schematic drawing illustrating the origin of desired and background signals in a sensor device in accordance with example embodiments.

In an exemplary embodiment of the present disclosure, illustrated in FIG. 2, the sensor device 100 is based on a sandwich ELISA like assay. The disclosure, however, is not limited thereto, but may for instance also be based on competitive assays and inhibition assays, where analogous sources of background are present. In a sandwich assay the target may comprise luminescent parts that are e.g. fluorescent, or may be attached to luminescent labels that are e.g. fluorescent labels. A fluorescence signal which is coming from a target which is bound to the surface 190 or immobilized in a 3D matrix or gel (not in the embodiment illustrated), whereby the target comprises fluorescent analyte, or a fluorescent label which is bound to the analyte, is part of the desired signal. In fluorescence detection, fluorescent signals coming from labels in the bulk are to be avoided. In example embodiments of the present disclosure which comprise an evanescent field generating structure 110, contribution of these signals can be reduced. Sources of the desired signal and of background signals in a device 100 comprising a sandwich ELISA like assay, according to embodiments of the present disclosure are illustrated in FIG. 2. FIG. 2 shows a sketch for the case of pre-incubation. In that case in a first step the detection probe (e.g., detection label) are mixed with the analyte. In a next step this mixture flows over the surface 190 with the capture probes. In example embodiments, real-time measurements can be performed, in which the rate at which the target binds to the surface can be followed. In this example the origins of the desired signal are the labels 210 indicated by a star which are connected to the targets 214 indicated by a rhombus and which are bound to the surface 190 (or could alternatively be immobilized in a 3D matrix or gel), In the example the labels 210 are fluorescent labels which are linked to a second affinity probe (e.g. second antibody 212). The second affinity probe is linked to a target 214 which is linked with a first affinity probe (e.g. first antibody 216). In the embodiment illustrated, the first affinity probes are forming the surface 190 on top of the evanescent field generating structure 110. Instead of a surface 190, in other embodiments of the present disclosure, the targets may be bound on a 3D-matrix or gel. In that case the first affinity probes are immobilized in a 3D matrix or gel. In the pre-incubation period, the labels indicated with reference 220 are those labels which are already connected with a target 214 but are not yet caught on the surface 190. In the embodiment illustrated the targets 214 have a rhombus shape, the detection probes (e.g. second antibodies 212) have an inverse Y-shape and the capture probes (e.g. capture antibodies, such as first antibodies 216) have a Y-shape. In such a device 100, besides other noise sources, the background signal may be coming from:

- (Auto)Fluorescent molecules 245, including labels 235 which are (non-specifically) bound to the surface 190 and which are not connected with the targets 214. These are illustrated by the L-shaped symbol in FIG. 2. These also include the labels 235 which are bound to the second antibody 212 and to the surface 190, but wherein the second antibody 212 is not bound to the target 214.
- Molecules 240 in solution. These may be (auto)fluorescent molecules 240 which have no link with a second antibody. They are illustrated by the pie-shape symbol in FIG. 2. They may for example be proteins. They mostly come from the sample, but can also come from the detection antibody mix, or the blocking agents (e.g. BSA). Molecules 240 are molecules that cannot be avoided, as they are part of the sample or a key ingredient in the assay. They may or they may not be fluorescent. When they are not fluorescent they still may scatter light and therefore increase the background signal.
- Free labels 230 in the solution which are bound to the second antibody 212 but wherein the second antibody 212 is not bound to the target 214. These labels 230 are intentionally fluorescent, and they are present in a real-time (wash-free) assay. These labels 230 are not present in an endpoint assay, after washing.
- Labels 220 in the solution which are bound to the second antibody 212 and wherein the second antibody 212 is bound to the target 214. These labels 220 are intentionally fluorescent, and they are present in a real-time (wash-free) assay. These labels 230 are not present in an endpoint assay, after washing.
- (Auto)Fluorescent centres 270 in the solution. The triangle in FIG. 2 is an illustration of such a fluorescent centre. These centres are present in the buffer (the solvent) itself (i.e. the matrix wherein the (bio)molecules are present). These centres may for example be present in a buffer used in a bioreactor (when using a sensor device 100 according to embodiments of the present disclosure in the bioreactor). In that case the buffer may be the cell culture medium which can have a complex composition and may comprise components that show luminescence (e.g. fluorescence). Often additional components are added depending on the exact nature of the cells/bacteria/yeasts/tissue that is cultured.

These centres 270 will stay also when changing to buffer flow whereas the autofluorescent molecules 240 are absent in the buffer.

(Auto)Fluorescent centres 280 in the structure for generating an evanescent field 110. The cross in FIG. 2 is an illustration of such a fluorescent centre.

(Auto)Fluorescent centres 290 in the substrate 160. The circle in FIG. 2 is an illustration of such a fluorescent centre.

(Auto)Fluorescent centres 260 in any other part of the device 100. The pentagon in FIG. 2 is an illustration of such a fluorescent centre.

Scattering 250, 251 of the excitation light. The arrows 250, 251 in FIG. 2 illustrate the scattering of the excitation light in case of free space excitation (250, e.g. illumination through a lens) and in the case of excitation using an evanescent field (251, e.g. using a waveguide). The scattering may e.g. be caused by imperfections or discontinuities in the device or the sample. Embodiments of the present disclosure comprise for example a rejection filter for filtering out the direct and/or reflected and/or scattered excitation light. However, the rejection ratio of this filter is not infinite and therefore a part of the scattered excitation light reaches the detector.

These background signals increase the noise and therefore decrease the signal to noise ratio, while it is desired to have the signal to noise ratio as large as possible.

Instead of pre-incubation, another approach would be to first send over the analyte, wash to remove any unbound particles, then send over the labelled detection probe, and wash again. In that case, some background sources are different/absent (e.g. the combination would not be present, and some auto fluorescent molecules 240 would not be present in the detection probe). However, in this approach we cannot do real-time measurements, so the time-to-response is longer)

Embodiments of the present disclosure are not limited to the standardized enzyme-linked immunosorbent assay (ELISA) as illustrated in FIG. 2 or its variants, but include any affinity-based assay and can for example also be DNA based. The DNA measurements may comprise a PCR step and may involve a higher fluorophore concentration.

In embodiments of the present disclosure, the at least one recorded pattern together with the measured pattern form a time-dependent dataset in one or two spatial dimensions. By correlating the measured pattern with the recorded pattern it is possible to increase the signal to noise ratio. A processor 140 may be configured for doing this correlation.

In embodiments of the present disclosure an expected pattern is a pattern which can be obtained in advance. The measured pattern can then be correlated with the expected pattern to increase the signal to noise ratio.

Devices according to embodiments of the present disclosure may comprise a surface 190 for binding the luminescent targets. In embodiments of the present disclosure the surface 190 may be designed such that luminescent targets may bind on certain locations on the surface. All these locations on the target form an at least one dimensional pattern. In these embodiments of the present disclosure this pattern is the expected pattern.

In example embodiments of the present disclosure, by correlating the measured pattern with the expected pattern, the signal to noise ratio can be increased. This correlation can be done using pattern recognition methods or by applying cross-correlation. For discrete functions the cross-correlation is defined as:

$$(f*g)[n] \equiv \sum_{m=-\infty}^{m=\infty} f[m]g[m+n]$$

where f and g are real (i.e. not complex, without imaginary components) functions. This cross-correlation is for infinite series. In embodiments of the present disclosure finite series implementations of the cross-correlation may be applied.

Figure 3:
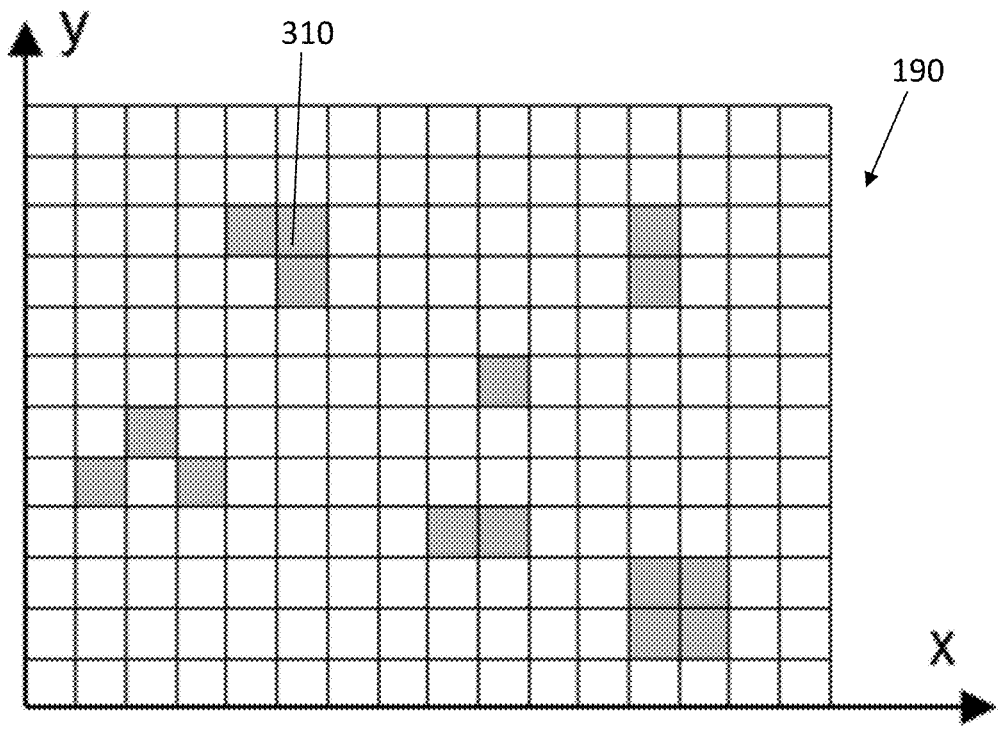
FIG. 3 is a schematic drawing of the surface of a sensor device wherein the surface comprises affinity probes in accordance with example embodiments.
Figure 4:
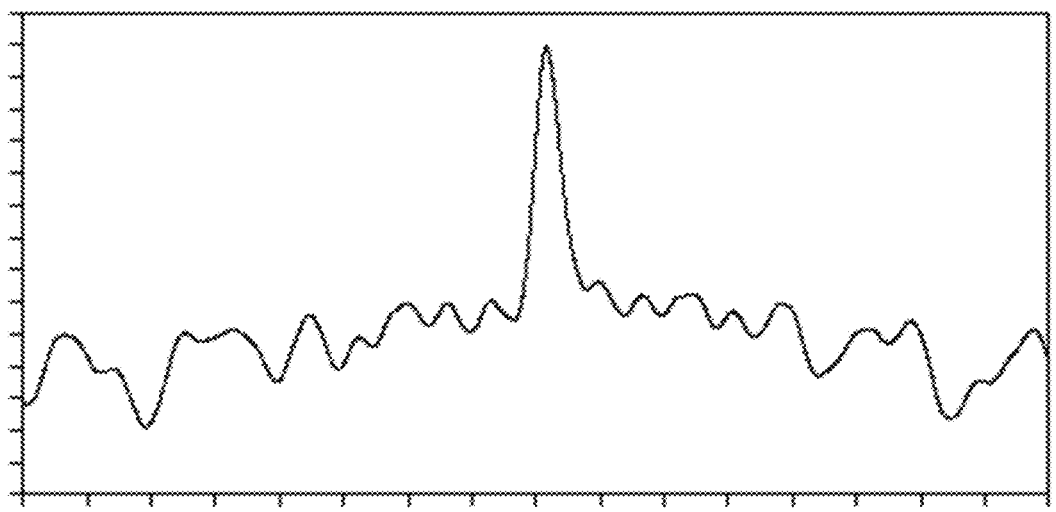
FIG. 4 is the cross-correlation of a one-dimensional measured pattern with a one dimensional reference pattern in accordance with example embodiments.

The pattern can be a regular pattern or a stochastic pattern. An example of such a pattern in accordance with an exemplary embodiment of the present disclosure is illustrated in FIG. 3. It shows a pattern of a rectangular surface 190. The greyed pixels 310 are those pixels where luminescent targets are measured. Cross-correlation between the measured pattern and the expected pattern results in a maximum when both are well aligned. In example embodiments of the present disclosure, that the noise is independent of the location in the applied pattern. In embodiments of the present disclosure the correlation between the desired pattern and the reference pattern results in a peak when there is no spatial offset between the measured pattern and the reference pattern and results in lower value when the measured pattern and the reference pattern are at a non-zero offset with respect to each other. In embodiments of the present disclosure the value of the peak, of the correlation between the measured pattern and the reference pattern, at zero offset compared to the baseline at non-zero offset is a measure for the desired signal and thus is a measure for the quantity of luminescent targets. The baseline at non-zero offset is a measure for the background signal. In example embodiments of the present disclosure, the background pattern does not show any correlation with the reference pattern, i.e. the value of the correlation is independent of the offset between both. An example of a correlation between a measured pattern and an expected pattern along the x-direction is illustrated in FIG. 4. The x-axis represents the offset between the measured pattern and the expected pattern (at the peak value of the correlation the offset is zero). The y-axis has an arbitrary scale. The peak amplitude of the correlation is proportional to the signal measured in the greyed pixels 310 in FIG. 3 along the line in the x-direction over which the correlation is taken. The off-peak amplitude is proportional to the background signal. The desired signal along the line in the x-direction over which the correlation is taken can be estimated by subtracting the off-peak amplitude from the peak amplitude.

In embodiments of the present disclosure there may be an offset between the measured pattern and the reference pattern (e.g. the expected pattern based on the designed surface of the sensor device). This offset may be caused by manufacturing inaccuracies. In these embodiments of the present disclosure the correlation peak, when correlating the measured pattern and the reference pattern, occurs at non-zero offset. The value of the peak compared to the baseline is still a measure for the desired signal and thus is a measure for the quantity of luminescent targets. The offset at which the peak occurs is a measure for the offset between the measured pattern and the reference pattern.

In embodiments of the present disclosure the processor 140 is configured to correlate subsections of the measured pattern with subsections of the reference pattern instead of using the complete 1D- or 2D patterns. These subsections can be the result of slicing the complete image into smaller parts. The subsections may also form a sliding window. In that case each pixel will be part of multiple subsections.

In embodiments of the present disclosure the pattern on the surface 190 of the sensor device 100 may be a periodic pattern. In that case the correlation between the expected pattern and the measured pattern repeats with the period of the pattern in the surface. In that case the repetition period of the pattern may be larger than the size of the individual features in the pattern.

In embodiments of the present disclosure the pattern on the surface of the sensor device 100 may be a pattern of circular spots on the surface 190. This pattern may be obtained by microdroplet deposition of the affinity probes ("spotting"). The diameter of the spots may range between 10 µm and 1 mm, between 10 µm and 200 µm. The distance between the spots (measured from edge to edge) may range between 10 µm and 5 mm, between 10 µm and 1 mm, between 10 µm and 500 µm, between 10 µm and 200 µm. The pattern may also be an arbitrary pattern of affinity probes obtained by (photo)lithography. The photolithographic techniques, such as those used in the semiconductor industry, are used to define locations where the capture probes are present or not, or where different types of capture probes are present. Processing techniques which may be applied are for example: using sacrificial layers, applying (area-) selective functionalization. The resulting distance dimensions may range between 10 nm and a few 100 µm, 100 nm to 10 µm. The processor 140 may be configured to combine together certain bindings for correlation purposes. Positive areas in the pattern may for example be combined together, and negative areas in the pattern may for example be combined together. Each area (positive or negative) comprises a plurality of points, on which averaging or any other data processing treatment may be applied so as to get an idea of the noise level and thus get a better idea of the reliability/error bars on the extracted numbers. Positive areas are areas where the affinity probes are present. These are areas where a desired signal is expected. Negative areas are areas where no signal is expected. A negative area is an area were no affinity probes are deposited. In embodiments of the present disclosure a blocking layer may be applied in the negative areas to minimize the background signal (e.g. the amount of non-specific binding). This way, the background signal might even become smaller than in the positive area. In embodiments of the present disclosure an affinity probe of a similar nature but selective to a different target may be applied in the negative areas. This different target can for example be a target that is known or expected to be absent in the sample, such that the background signal in this negative control area is as similar as possible to the background signal in the positive area. In embodiments of the present disclosure it is possible to use an affinity probe of a similar nature but selective to a different target such that the background signal in the negative area is more similar to the background signal in the positive area as would be the case when a blocking layer would be applied in the negative areas.

In embodiments of the present disclosure the affinity probe may for example be an antibody. By varying a small region in the antibody the selectivity towards a specific target may be altered. The overall surface however may remain similar.

In embodiments of the present disclosure the pattern on the surface 190 of the sensor device 100 is a stochastic pattern or a pseudo-stochastic pattern.

Figure 9:
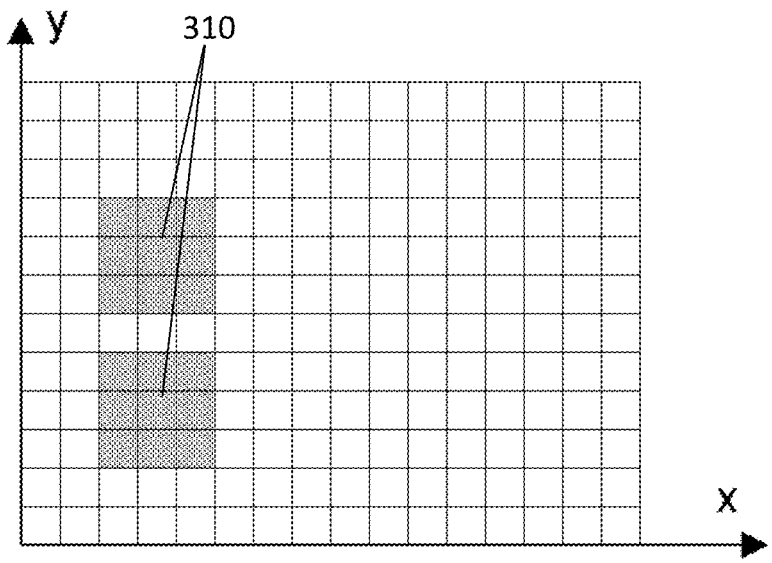
FIG. 9 to FIG. 15 show a sequence of recorded patterns in case of moving autofluorescent debris over the surface of a sensor device wherein the surface comprises affinity probes in accordance with example embodiments.
Figure 10:
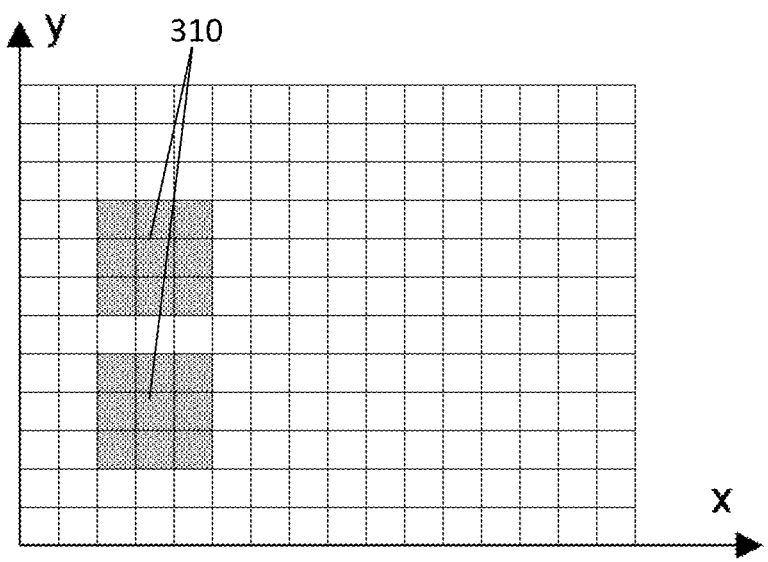
Figure 11:
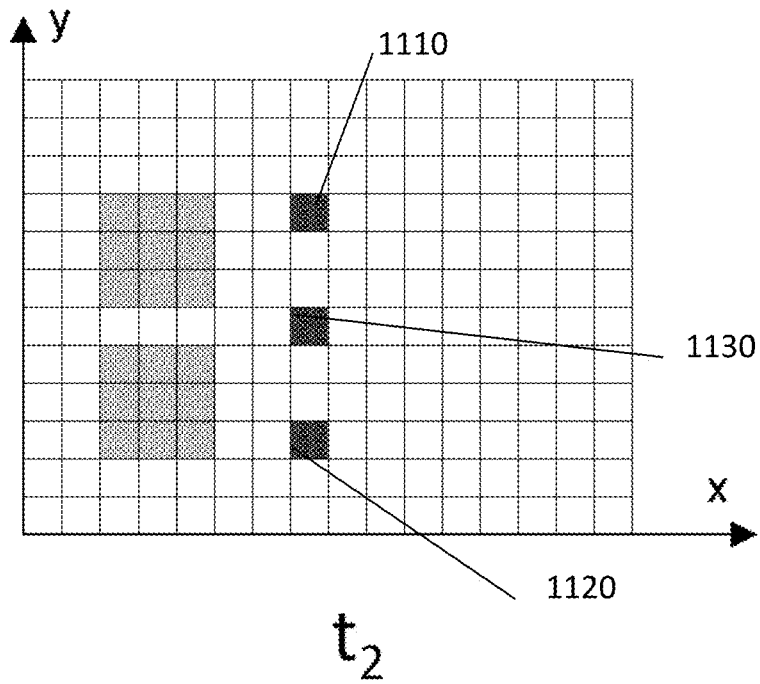
Figure 12:
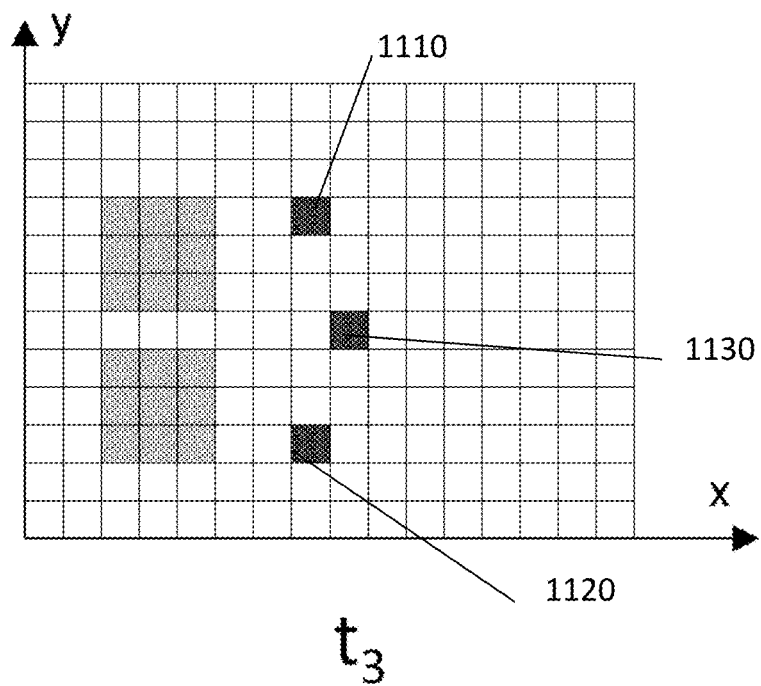
Figure 13:
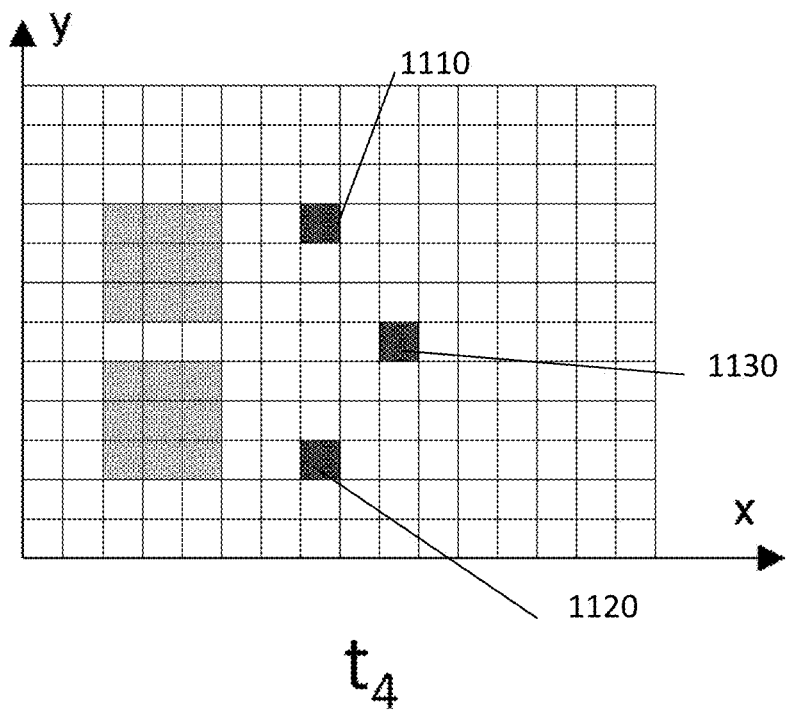
Figure 14:
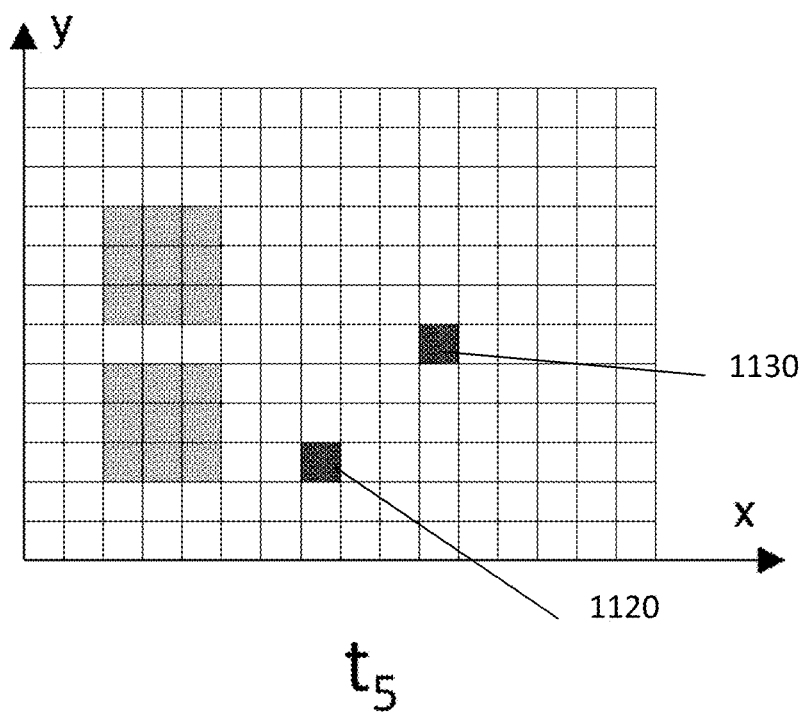
Figure 15:
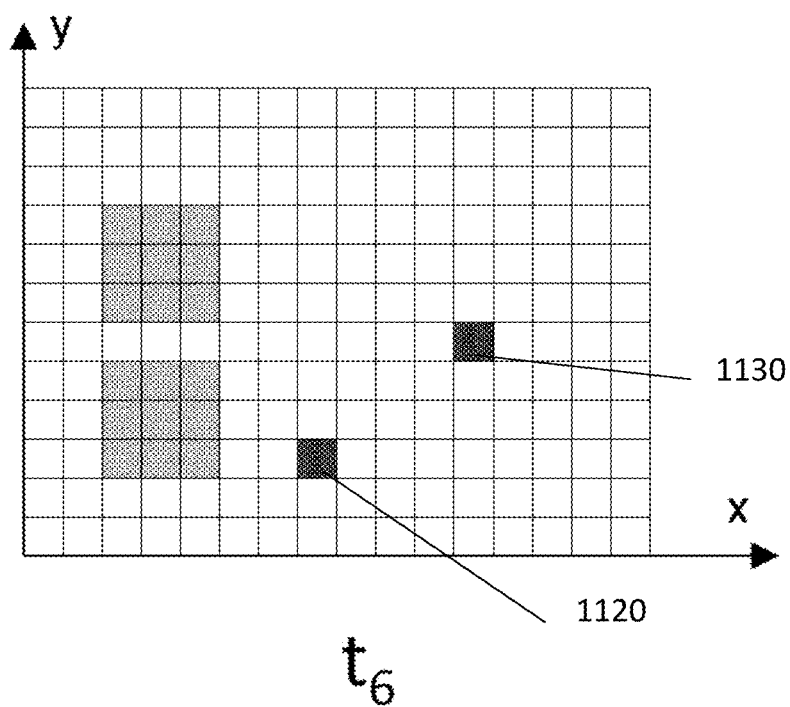

In embodiments of the present disclosure the reference pattern is a recorded pattern. In these embodiments, the measured pattern is correlated with a recorded pattern at a different time point or with a plurality of recorded patterns at different time points. The peak in the correlation at offset zero (in the spatial domain) is a measure for the desired signal. Any additional peaks at non-zero offset indicate a mobile source of background, e.g. a large piece of autofluorescent debris, or an agglomeration of labels that is flowing past the sensor, or in embodiments of the present disclosure with single molecule or single label sensitivity this may even be an individual immobilized label flowing past the sensor. FIG. 9 to FIG. 15 show a sequence of recorded patterns in case of moving autofluorescent debris. FIG. 9 and FIG. 10 show the pattern at time instances $t_0$ and $t_1$, respectively. In between these time points the pattern was stable. The greyed pixels 310 are those pixels where luminescent targets are measured. At t2 (FIG. 11) new signals 1110, 1120, 1130 appear at 3 new locations (as an example only). During the following few time points, the top 1110 and bottom 1120 new signal are stationary, while the middle one 1130 moves (see FIG. 12-FIG. 13). Cross-correlation of this central point 1130 will show a peak at non-zero lateral offset. Working with sub-regions, according to embodiments of the present disclosure, has two results: (1) The rest of the image gives a large cross-correlation peak at zero offset. This peak is strongly reduced by going to a smaller sub-frame, making the correlation peak at non-zero offset clearer. (2) The peak at non-zero offset will appear only in those subframes that comprise the moving signal. This allows for identifying where the moving signal is, and then processing it, e.g. removing it from the analysis/from the images. So this can give a very targeted removal of some noise sources without tampering with the rest of the data. Or this allows to confirm that the subframes without correlation peak at non-zero offset contain no moving signals, and to increase the confidence in the results extracted from those parts.

Moving to later time points (see FIG. 14-FIG. 15): at time $t_5$ the top new signal 1110 disappears again, while the bottom new signal stays thus resulting in a different time correlation. This may indicate the top signal 1110 was generated by a weakly bound non-specific binding event, while the bottom signal corresponds to a strongly bound specific interaction. Also here, sub-region analysis may allow for selective removal of the top signal from the recorded data. In example embodiments of the present disclosure, these correlations are done on subsections of the reference pattern and of the recorded pattern as this allows to better identify and localize the mobile background generator and/or the location of the capture probes (capturing the luminescent targets). In example embodiments of the present disclosure, once the mobile sources of background have been identified, they can be, at least partly, removed from the background pattern. Also in these correlations the off-peak amplitude of the correlation is proportional to the background signal.

In embodiments of the present disclosure the processor 140 is configured to correlate the measured pattern and the recorded pattern thereby taking into account the dynamic behaviour of the desired signal and of the background signal.

The desired signal may for example have a long correlation time, i.e. once a target binds specifically it stays on for a long time (e.g. dissociation times of hours and more compared to assay times of minutes).

Some events, such as strong non-specific binding, or scattering, may also stay on for a long time, and cannot be distinguished, by taking into account the dynamic behaviour of the desired signal and the background signal, from the desired signal.

However: a significant fraction of the non-specific binding events have short dissociation times (minutes, seconds, or less), and can be distinguished from the desired signal by taking into account the dynamic behaviour of the desired signal and the background signal.

Bulk sources of background (i.e. not bound to the surface but moving in and out of the bulk volume that is measured) have characteristic times of milliseconds or microseconds, and can also be distinguished from the desired signal by taking into account the dynamic behaviour of the desired signal and the background signal.

Devices 100 according to embodiments of the present disclosure moreover comprise a modulator 130 for modulating a physical parameter which influences the luminescence of the luminescent target and/or the luminescence of the background contributions such that the resulting modulation of the desired signal is different from the modulation of the background signal. The physical parameter may for example be the temperature of the target and/or the power/frequency of the excitation light and/or the pH of the solution in which the target is present and/or the concentration of the target.

A device 100 according to embodiments of the present disclosure moreover comprises a processor 140 which is configured to correlate the luminescence detected by the detector 120 with the modulation of the physical parameter. The cross-correlation between both might for example be calculated.

In particular embodiments, the modulator can change the temperature of the device 100. In such embodiments, luminescent labels (e.g. fluorophores) may be chosen of which the luminescent response has a distinct temperature dependency. In example embodiments of the present disclosure, the desired signal has, in that case, a different temperature behaviour than the background signal.

The modulator 130 may comprise a heater and a heater control system for controlling the temperature of the system. The heater control system may include a temperature sensor. This temperature sensor may be used for controlling the temperature (in a closed loop system) or for monitoring the temperature only (in an open loop system). The heater may for example be a resistive heater or a Peltier element or a radiative heater or an infrared heater.

Figure 16:
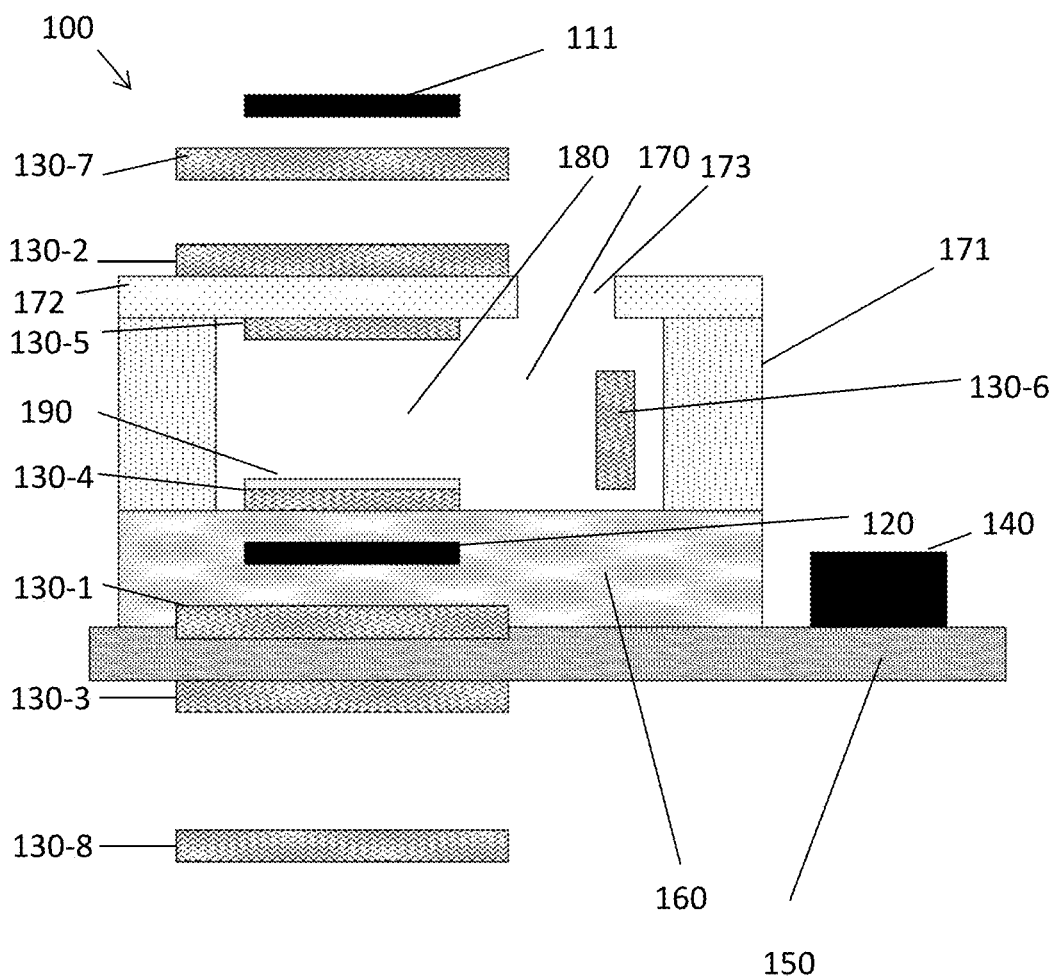
FIG. 16 shows possible positions of a heater in a device in accordance with example embodiments, wherein the device is configured for free space excitation.

FIG. 16 shows possible positions of a heater modulator 130 (e.g., a heater), in a device 100 in accordance with embodiments of the present disclosure wherein the device is configured for free space excitation. The heater may be located on position:

130-1 corresponds with the bottom of the device 100, in the example this is between the detector 120 and the PCB 150

130-2 corresponds with the top of the device 100, in the example this is above the top wall 172 which closes the microfluidic channel; in that case the light source 111 may be at the bottom (e.g. with transparent substrate)

130-3 corresponds with the backside of the PCB 150 (if present), in the figure this is on the side of the PCB opposite to the cavity 180

130-4 inside the cavity, under the surface 190

Figure 17:
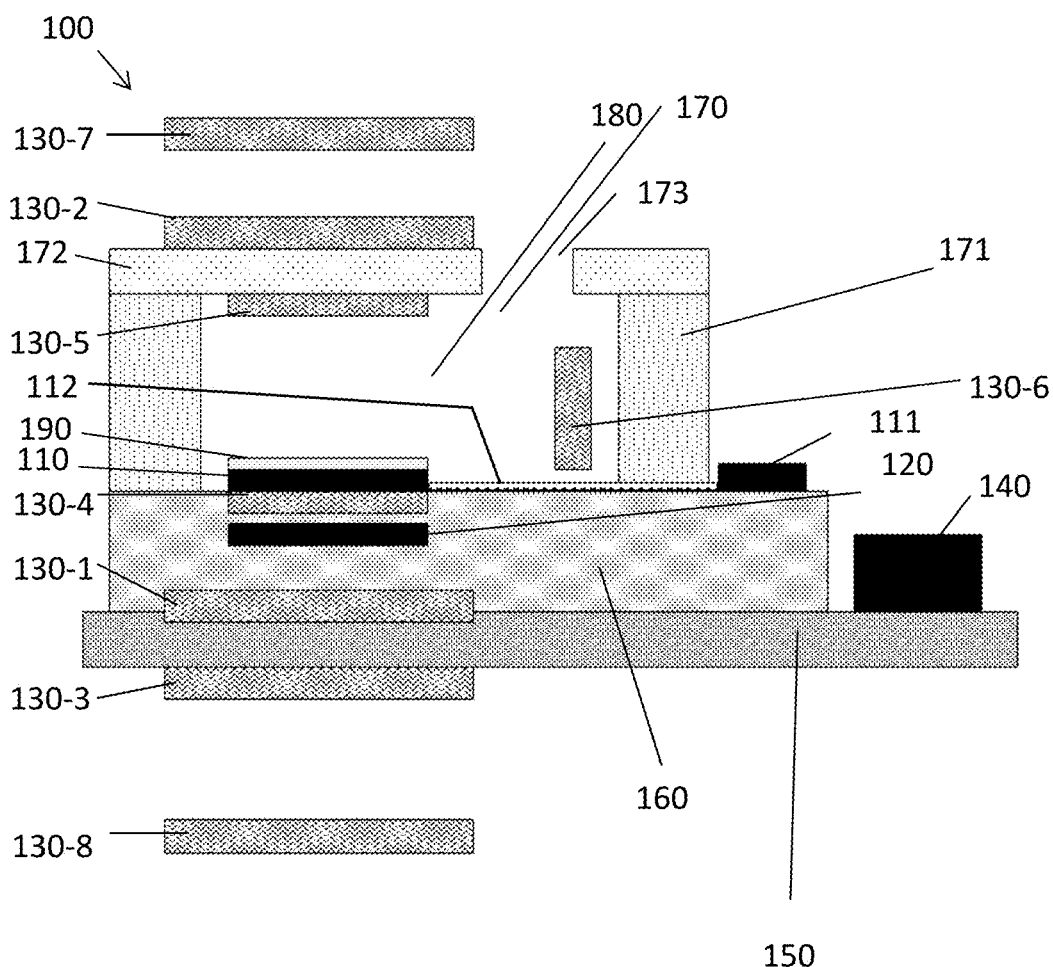
FIG. 17 shows possible positions of a heater in a device in accordance with example embodiments wherein the device is configured for evanescent excitation.

130-5 inside the cavity, at the top side; in that case the light source may be at the bottom 130-6 somewhere in the channel; in that case the heater may for example be carried to the measurement cavity 180 by the liquid flow consisting of the sample or a buffer 130-7, 130-8 not in contact with the rest of the device 100; in that case the heater may for example be a radiative or an infrared heater FIG. 17 shows the possible positions of a modulator 130 (e.g., a heater), in a device 100 in accordance with embodiments of the present disclosure wherein the device is configured for evanescent excitation. The possible positions of the heater are essentially the same as in FIG. 16, except that location 130-4 where the heater has to be positioned below the evanescent structure 110, such the evanescent field generating structure 110 is between the surface 190 and the heater. Location 4 is such that the heater is outside of the evanescent field.

In embodiments of the present disclosure the processor 140 takes into account the dependency of the luminescence of the label on the modulation of the physical parameter and/or the dependency of the background signal on the modulation of the physical parameter. The physical parameter may for example be the temperature; the present disclosure, however, not being limited thereto. In embodiments of the present disclosure a temperature variation is applied between subsequent measurements and the known (or calibrated) temperature dependence of the background signals and of the desired signal is used to remove or attenuate the background response from the output signal of the detector 120.

Figure 5:
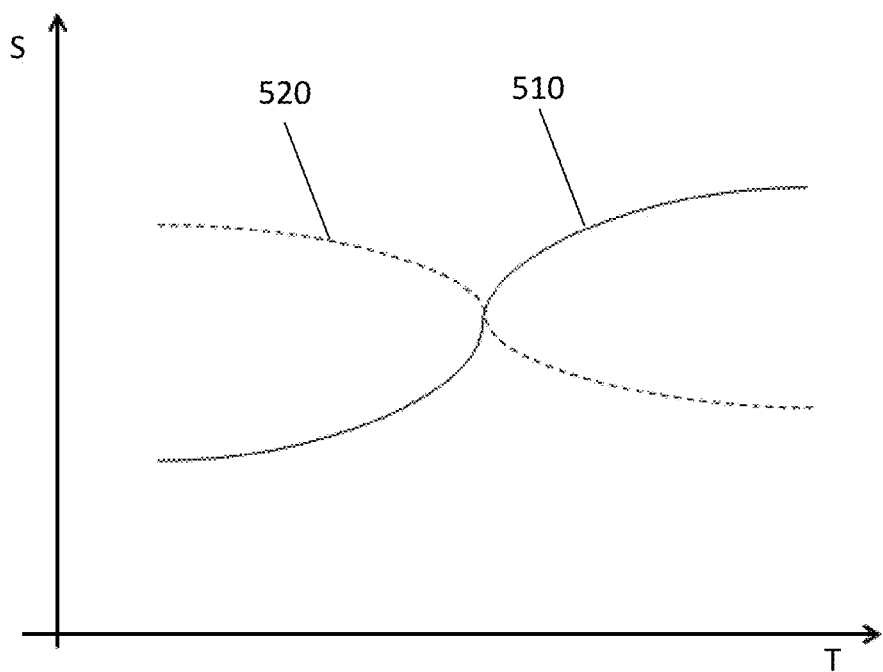
FIG. 5 shows a temperature dependence of the signal of fluorophore which is quenched at low temperature and a temperature dependence of a background signal in accordance with example embodiments.

FIG. 5 illustrates an example of the temperature dependence of the signal of a fluorophore which is quenched at low temperature (line 510) and an example of the temperature dependence of a background signal (dashed line 520). The signal strength S is shown in function of the temperature T. In this example the power of the fluorescent signal of the quenched fluorophore is increasing with temperature whereas the power of the background signal is decreasing with temperature. In other embodiments of the present disclosure other temperature relationships may exist as long as the modulation of the desired signal is different from the modulation of the background signal. By measuring at different temperatures, the signal from the quenched fluorophores can be separated from the background signal by taking into account the respective temperature dependencies.

The processor 140 may for example be configured to apply the following exemplary correlation. If the signal (S) and the background (B) change with a factor a and b, a and b having been calibrated, when changing the temperature from T1 to T2, e.g.

$$S2 = a \times S1 \text{ or } S2/S1 = a \text{ (e.g. } a > 1 \text{ on FIG. 5)}$$

$$B2 = b \times B1 \text{ or } B2/B1 = b \text{ (e.g. } b < 1 \text{ on FIG. 5)}$$

The responses (=signal+background) R1 and R2 are measured and can be written as:

$$R1 = S1 + B1 \tag{1}$$

$$R2 = S2 + B2 = a \times S1 + b \times B1 \tag{2}$$

S1 and B1 can be determined by solving these two equations since R1 and R2 are known (measured), and since a and b are known (calibrated). In this particular case: multiply eq (1) by b, then subtract eq (2):

$$b \times R1 = b \times S1 + b \times B1 b \times \tag{1}$$

$$R2 = a \times S1 + b \times B1$$

$$b \times R1 - R2 = (b-a) \times S1 + (b-b) \times B1 = (b-a) \times S1$$

$$\rightarrow S1 = (b \times R1 - R2)/(b-a) \tag{2}$$

B1 can be determined in a similar way

Figure 6:
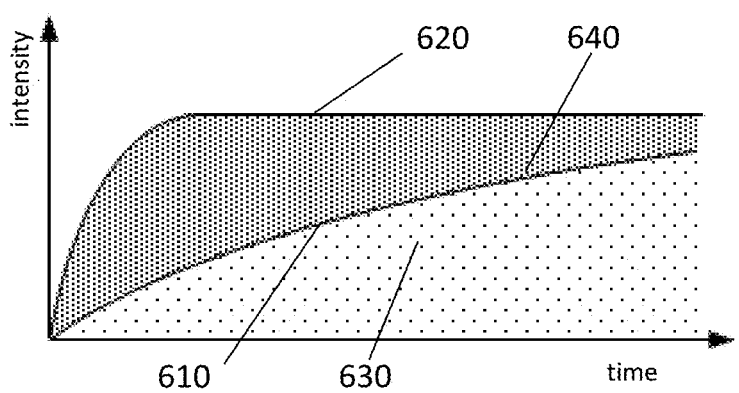
FIG. 6 shows the intensity in function of time of the desired signal and of the measured signal measured in a sensor device in accordance with example embodiments.

This is true in general, even if more data points (e.g., more equations R3= . . . , R4= . . . ) and/or a more complex temperature modulation as e.g. FIGS. 5-6 are applicable. In those cases the system is overdetermined. Instead of solving these equations analytically, which would give contradictions because of random noise, curve fitting may be used (e.g. maximum likelihood estimations).

In general, the fluorescent response of the fluorophore will be temperature dependent. In embodiments of the present disclosure, specific fluorophores may be used for which the fluorescence may increase with increasing temperature (e.g. from 10° C. towards 60° C.). This is may be caused by the fact that a quencher is bound to the fluorophore, and that the quenching is temperature dependent. At lower temperatures the quencher may be bound closely to the fluorescent group and therefore the fluorescence may be quenched whereas at higher temperatures the interaction may be broken causing the quencher to move further away and the label to become fluorescent. The brightness of (some of the) background sources (e.g. (auto)fluorescent molecules 240, 245, (auto)fluorescent centres 260, 270, 280, 290, scattering 250, 251) may show a different temperature dependence. This difference in temperature behaviour can be exploited to increase the signal to noise ratio by modulating the temperature and correlating the measured signal with the modulation, taking into account the temperature dependency of the fluorescent label and the temperature dependency of the free fluorophores (at least partly causing the background signal).

In embodiments of the present disclosure labels may be used which have an intrinsic temperature dependency. The labels may be designed specifically to increase the temperature dependency of the label.

In embodiments of the present disclosure different binding events may have a different temperature dependence. Since for example some non-specific interactions are weaker than a specific bond, such non-specifically bound molecules will disconnect more easily from the surface 190 than specifically bound molecules. This will result in a different temperature dependency of the fluorescent response for such non-specifically bound molecules compared to specifically bound molecules. The part of the background signal generated by the non-specifically bound molecules will decrease when they are disconnecting from the surface with increasing temperature. When disconnected they will go up in the bulk which is, in embodiments with an evanescent field generating structure 110, not illuminated by the light source. Hence, by bringing the surface 190 to a higher temperature, high enough to break such non-specific bonds, but low enough not to break specific bonds, the signal to noise ratio can be improved.

Some other non-specific interactions are stronger than a specific bond, such non-specifically bound molecules will disconnect less easily from the surface 190 than specifically bound molecules. This will result in a different temperature dependency of the fluorescent response for such non-specifically bound molecules compared to specifically bound molecules. The part of the background signal generated by the non-specifically bound molecules will remain unchanged when the specifically bound molecules are disconnecting from the surface with increasing temperature. When disconnected they will go up in the bulk which is, in embodiments with an evanescent field generating structure 110, not illuminated by the light source. Hence, by bringing the surface 190 to a higher temperature, high enough to break specific bonds but not such non-specific bonds, the signal to noise ratio can be improved.

The temperature may be modulated in several ways. A temperature step or a series of temperature steps may be applied. A continuous modulation, such as for instance a sine wave modulation, of the temperature may be applied.

In embodiments of the present disclosure the modulator 130 may change the physical parameter(s) before a binding equilibrium is reached or after the binding equilibrium is reached. In the example of FIG. 2 first antibodies 216 may be linked to the surface 190 of the device 100. These antibodies 216 link with the targets 214 and through second antibodies 212 the luminescent label 210 may be linked with the analyte. The surface 190 may for example comprise between 1000 and 1 000 000 binding sites per $\mu m^2$ for example 20000 binding sites per $\mu m^2$. In embodiments of the present disclosure the number of binding events per $\mu m^2$ of surface 190 may be obtained by evaluating the following formula:

$$k_{ON}[A][B]$$

wherein [A] is the target concentration, and wherein [B] is the surface density of the free binding sites, and wherein $k_{ON}$ is the association rate constant. $k_{ON}$ is among other things defined by the reaction kinetics between the target and the capture probe and the mass transport kinetics of the target in the solution. The association rate constant may for example have an order of magnitude of $k_{ON}=10^5 M^{-1} s^{-1}$. If the target concentration is for example [A]=1 nM then:

$$k_{ON}[A]=10^{-4} s^{-1}$$

meaning that each binding site has a chance of $10^{-4} s^{-1}$ to bind with a target.

At a low target concentration only a limited number of binding sites will be occupied. If the surface density of the binding sites (e.g. the surface 190 comprising the first antibodies) is $[B]=2\times 10^4$ $\mu m^2$ the number of binding events per $\mu m^2$ per second equals:

$$k_{ON}[A][B]=2 \ s^{-1} \ \mu m^2$$

This rate decreases linearly with the target concentration and therefore also the desired signal decreases linearly with the target concentration.

The modulator 130 may modulate a physical parameter when the concentration of targets bound to the surface 190 has reached an equilibrium or when the concentration is still increasing.

In embodiments of the present disclosure, mainly the surface 190 of the substrate 160 or a limited three dimensional volume is illuminated. This may be done by evanescent excitation. In these embodiments the bulk of the sample is not illuminated using free space light but using an evanescent light near the surface 190. The evanescent field region may have a thickness of a few nm-thick or even 10 nm thick or even between 10 nm and 100 nm thick. Such evanescent illumination is also referred to as TIRF (total internal reflection fluorescence). This can be achieved by having a beam of light, coming from the evanescent field generating structure 110, incident on the interface between the evanescent field generating structure 110 and the cavity 180 at an incident angle below the critical angle, resulting in a total internal reflection. It can also be achieved by confining the light in a guiding structure such as a waveguide. TIRF can be applied in example embodiments of the present disclosure. Only the luminescent labels (e.g. fluorophores) which are immobilized at the surface 190 of the substrate evanescent field generating structure 110, or which are in its immediate neighbourhood (i.e., within the range of the evanescent field) will be illuminated this way. The substrate 160, on which evanescent field generating structure 110 is fabricated may be a semiconductor substrate, a glass substrate, or any other suitable type of substrate. It may be a quartz substrate. Luminescent labels which are in the bulk solution are thereby not measured. When these luminescent labels in the bulk solution are not excited they will also not generate a background signal.

Embodiments of the present disclosure comprise a waveguide for guiding the excitation light towards the evanescent excitation plane. In example embodiments of the present disclosure that the luminescent labels (e.g. fluorophores) in the bulk solution will not be excited. Only the luminescent labels which are in the evanescent field volume will be illuminated. These luminescent labels are mainly the surface immobilized luminescent labels. The labels in the bulk, which are not illuminated or which are less illuminated than the immobilized labels at the surface, will therefore generate a smaller luminescent signal than the immobilized labels at the surface. In example embodiments of the present disclosure, by only illuminating the evanescent excitation plane, the signal to noise ratio can be increased.

In alternative embodiments of the disclosure, the desired signal may be separated from the background signals by modulating parameters different from temperature, such as for instance light, pH, other chemical stimuli, or the concentration of the target and/or of other assay components. By going through the isoelectric point of a fluorophore or an (auto)fluorescent centre, its charge state changes. This changes its electronic configuration, and may influence its optical properties (such as the absorption cross-section, also known as extinction coefficient, and/or the emission quantum efficiency and/or the absorption and/or emission spectra). In example embodiments of the present disclosure, the physical parameters are selected such that they modulate the desired signal and such that modulation of the physical parameters does not have an effect on the scattering. By modulating these physical parameters and correlating the measurement result with the modulation, the contribution of the scattering signal can be decreased and may be even removed from the measured signal. In example embodiments of the present disclosure, the physical parameters are selected such that modulation of the physical parameters has a different effect on the modulation of the desired signal than on the modulation of some of the background signals (e.g. some sources of fluorescent background). By correlating the measurement result with the applied modulation the contribution of these background signals can be decreased and may be even removed.

In embodiments of the present disclosure where the pH is modulated, labels may be used for which the luminescence is depending on the acidity of the environment they are in. Such a label may for example be 5(6)-Carboxynaphthofluorescein, or 7-Hydroxycoumarin-3-carboxylic acid, or 6,8-Dihydroxy-1,3-pyrenedisulfonic acid disodium salt. A luminescent label might be chosen for which the absorption spectrum or the emission spectrum or both spectra change under influence of a changed acidity. In embodiments of the present disclosure a pH sensitive fluorophore may be used. In embodiments of the present disclosure this fluorophore is provided with an end group such that it can be used to label antibodies or other capture probes.

In order to be able to modulate the pH of the sample, a modulator 130 in a device according to embodiments of the present disclosure may comprise a reservoir with a fluid of a basic or acidic nature, with a pH different from the pH of the sample. When the modulator 130 is activated, the fluid of the reservoir may be mixed with the sample, so as to change the sample's pH. For instance, the pH of the sample may be changed such that the luminescent labels bound to the analyte have a strongly different absorption or emission spectrum, such that a background signal can be determined, which can then be deducted from the earlier measurement signal so as to obtain a signal with an improved signal to noise ratio.

The pH of the sample may also be modulated during sample preparation wherein different mixtures are prepared that are nominally identical, except for a different pH. This may for example be done in the case of pre-incubation with the detection probe. In that case for example a solution (buffer) is added with the probe. In the sample preparations samples may be prepared that are nominally identical, except for a different pH. These different samples may flow alternatingly through the cavity 180, over the surface 190.

In embodiments of the present disclosure where excitation light is modulated, photoswitchable labels may be used (e.g. $C_{30}H_{19}F_6N_5O_6$). These dyes are photoactivatable by modulating the excitation light source. In example embodiments photoswitching may be reversible.

In embodiments of the present disclosure, the modulation of the physical parameter may be used to selectively switch on or off the signal of the fluorophores, or of the background contributions. By doing measurements at different parameter levels, knowing that at one level the desired signal is switched off, the background signal can be determined, which determined background signal can then be removed (e.g. subtracted) from the signal measured at the other level of the parameter. Instead of completely switching on/off contributions to the desired signal and/or to the background signal partial switching may be implemented.

In embodiments of the present disclosure the modulator 130 can modulate the amount of luminescent targets contributing to the desired signal and/or to the amount of sources contributing to the background signal. The targets may be immobilized against a surface 190. Modulations may be applied that influence the amount of immobilized target molecules (with label), or the rate of change of this amount, in a different way than that they influence the amount of (some of) the background contributions, or the rate of change of this amount.

In embodiments of the present disclosure some non-specific bonds (which bind a background source against the surface 190) are much weaker than the specific bonds (or affinity bonds which bind the targets against the surface 190). Stimuli (e.g. pH, ionic strength, adding a detergent, changing the solvent (e.g. mixing some ethylene glycol or acetonitrile into the water)) that break the weak non-specific bonds (background) and not the specific bonds (signal) can be used to remove this part of the background.

Some non-specific bonds (e.g. hydrophobic interactions) are very strong, and will not be broken by the stimuli that are used to break the specific (affinity) bonds. Also other sources of background are not (or less) affected by such stimuli, such as scattering, autofluorescence of fixed centres in the device, etc. Stimuli that break the specific bonds (which generate the desired signal) and not the strong non-specific bonds (background) and other unaffected sources of background can be used to remove this part of the background. After breaking the specific bonds the measured signal is only a background signal. This background signal can be subtracted from the signal measured before the specific bonds were broken.

Modulations or stimulations with effect on the binding or immobilization of the desired and/or undesired events include pH, ionic strength, surfactants, solvents, temperature, etc.

In embodiments of the present disclosure the modulator 130 can modulate the rate at which the amount of luminescent targets increases. Instead of modulating the amount of bound material, i.e. by moving it on and off the sensor surface 190, the rate at which the target binds to the surface 190 may be modulated.

In one embodiment this is may be done by alternating the flow over the sensor surface 190 of the device 100 between flow of a liquid comprising the unknown concentration of the target, and a flow of a buffer without the target molecules or with a known concentration of target molecules. In example embodiments of the present disclosure, the association of the target continues for much longer before it saturates (even hours) than the accumulation of the background signals (which can reach saturation in e.g. minutes or seconds). This is especially the case when the targets are present at low concentration (where the signal-to-noise ratio is worst). In that case the association of the target continues for much longer before it saturates (even hours) than the accumulation of the background signals (which can reach saturation in e.g. minutes or seconds).

Hence, after the background signals have saturated, modulating the concentration of the target molecule (e.g. between unknown sample and zero) will modulate the slope of the accumulation curve. The difference in slope between accumulation with and without unknown sample can then be used to determine the target concentration in the unknown sample. In embodiments of the present disclosure the slope is obtained by comparing the slope measured in the presence of the known (for instance zero) concentration with the slope measured in the presence of the unknown concentration.

In embodiments of the present disclosure the slope is determined by measuring multiple times. This may be done by measuring continuously in real-time. Thereby, a plurality of measurements is obtained which allows to accurately determine the slope. In example embodiments, a slope measurement is not sensitive to offsets or to any background signals which have already saturated.

In example embodiments, any remaining drifts and fluctuations in the device 100 can be eliminated as long as they are independent of the switch between unknown sample flow and reference flow. Such drifts and fluctuations can e.g. come from temperature drift or fluctuations in the setup, drift or fluctuations in the intensity of the excitation light, of the coupling efficiency of the fluorescent light into the detector, etc.

In embodiments of the present disclosure the buffer or reference flow with a known amount of target molecules or without target molecules has a similar composition as the unknown sample, such that the background signals themselves are changed as little as possible by the modulation. This can be achieved by making the matrix of the buffer solution similar to the matrix of the unknown sample; or also by adding the same or similar blocking agents to both the unknown sample and the buffer.

Figure 18:
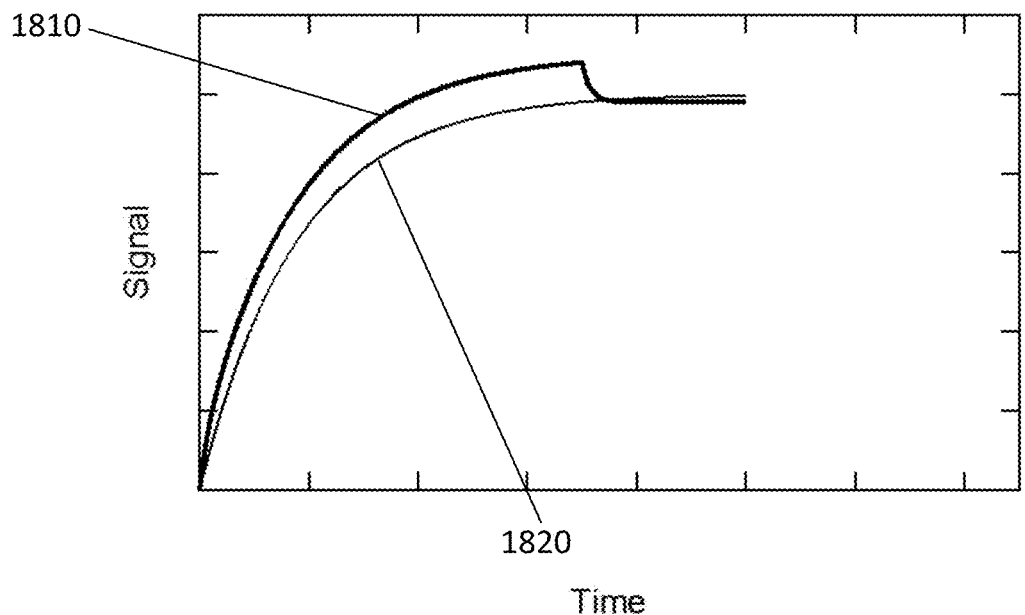
FIG. 18 shows a measured signal and a desired signal in an endpoint measurement in accordance with example embodiments.

In an exemplary embodiment of the present disclosure alternating the flow between sample and buffer is done as follows. In an assay, when the injection of the sample is started, there is typically also a change in the solution, e.g. from running buffer to the actual sample (e.g. serum) in which the target needs to be measured. This gives rise to additional background signals, such that the measured signal 1810, which is the desired signal plus the background signal, differs from the desired signal 1820, as shown in FIG. 18. In an endpoint measurement, one switches back to the running buffer and waits for the background signals to disappear before performing the actual measurement.

Figure 19:
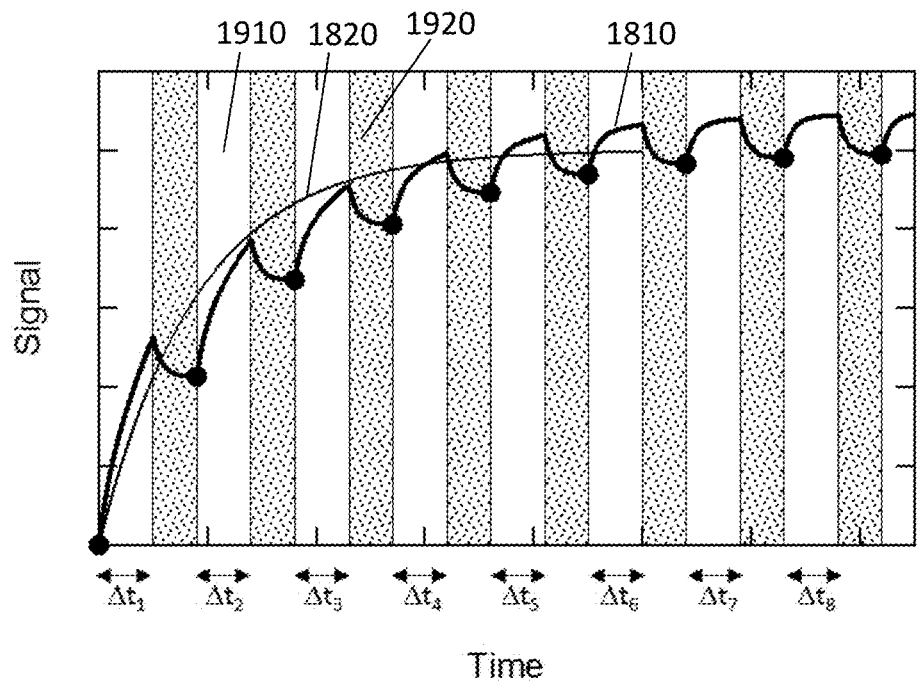
FIG. 19 shows the effect on the measured signal of alternating the buffer and sample, in accordance with example embodiments.
Figure 20:
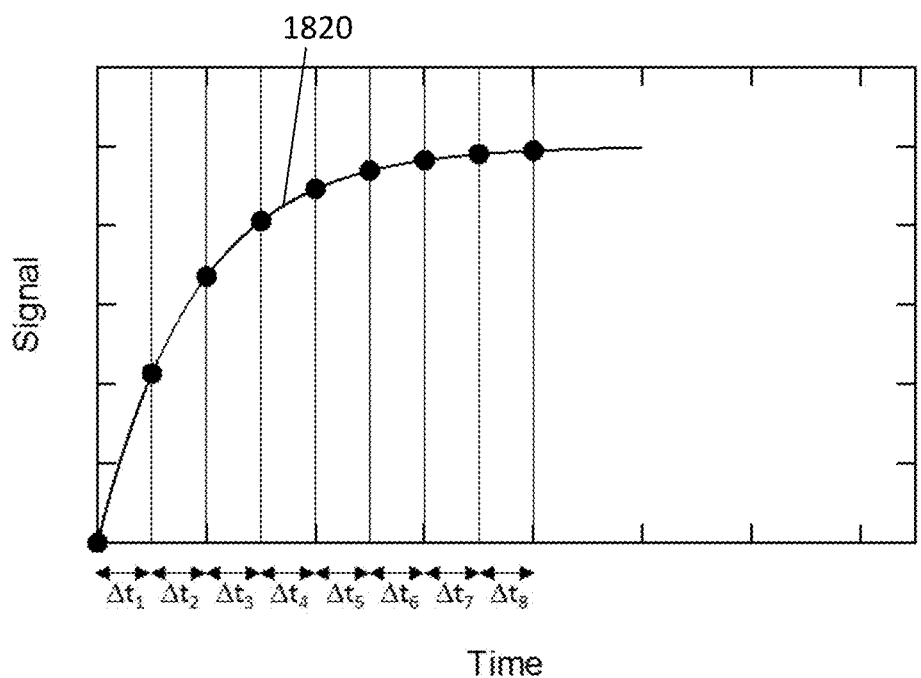
FIG. 20 shows the obtained desired signal in accordance with example embodiments.

In a real-time measurement, when one tries to follow the time evolution of the desired signal, the measurements would in fact give the time evolution of desired signal plus background signal. In embodiments of the present disclosure this problem is solved by switching back and forth between sample and running buffer as is illustrated in FIG. 19. The targets (+label, in the case of pre-incubation), connect with the affinity probes and build up on the surface during the "white" intervals 1910 on the graph, and data points can be taken at the end of the "grey" intervals 1920 with buffer flow, when the background signals have vanished. By plotting these data points as function of the total accumulation time (i.e., only taking into account the "white" intervals 1910 and not the "grey" ones 1920), the time evolution of the desired signal only, without the background contributions, can be reconstructed. This is illustrated by the curve in FIG. 20. In this way the elements of real-time measurements (faster time-to-result, better accuracy, better identification of unwanted trends or deviations from the desired protocol, e.g. identification of air bubbles in the sample) can be combined with the elements of endpoint measurements (e.g. wash steps that remove many of the parasitics or background signals).

In embodiments of the present disclosure the processor 140 is configured to correlate the measured pattern with the at least one reference pattern, taking into account the modulation of the physical parameter. The at least one reference pattern is in this case a recorded pattern. Also a series of reference patterns (in this case a time sequence of recorded patterns) may be used for the correlation.

In embodiments of the present disclosure at least two different excitation signals, each with a different wavelength, are generated. The luminescence generated by the luminescent target is dependent on the wavelength of the excitation signal. This dependency can for example be obtained by calibrating the luminescent target in advance. The luminescent target may for example be comprising a target linked with a fluorescent label. In embodiments of the present disclosure the spectral response of the luminescent target is different from the spectral response of the background. The fluorescence response of the specifically bound fluorophores may for example be different from the fluorescence response of the fluorophores which are not bound to the target and which are thus generating a background signal. In example embodiments of the present disclosure, by correlating the measured signal with the expected signal, the signal to noise ratio can be increased.

Devices 100 according to embodiments of the present disclosure moreover comprise a bleaching device (not shown) for bleaching (e.g., destroying, making non-luminescent) of at least part of the sources generating the background signal.

In embodiments of the present disclosure the processor 140 is configured to trigger the bleaching device (not shown) to start bleaching. Thereby the difference in time evolution between the intensity of the desired signal and the intensity of the background signal is exploited, the latter having a faster time evolution and being saturated before the intensity of the desired signal is saturated. In embodiments of the present disclosure the processor 140 is configured to trigger the start of bleaching. The processor 140 may for example be configured to follow in real time the time evolution, e.g. slope, of the measured signal. Once this slope has dropped to a pre-determined value, for example 30%, or 20%, or 10%, of its initial value, the bleaching may be stopped. In that case the background may have increased to for example 70%, or 80%, or 90% of its final value.

In the following points this algorithm is illustrated by examining the dynamics which apply in a device 100 in accordance with embodiments of the present disclosure (the algorithm is not limited to embodiments and devices with these dynamics).

Assuming a first order affinity of binding reaction A+B<->AB with reaction rate constants $k_{on}$ and $k_{off}$.

The full time evolution is given by $AB(t) \sim (1-e^{-t/\tau})$, where $\tau$ is a constant.

So the slope as function of time is given by $dAB(t)/dt \sim (1/\tau)e^{-t/\tau} \sim e^{-t/\tau}$ ($\tau$ is a constant, so it does not change the shape of the time dependence, only the scale factor)

Both the level (AB) and the slope change with the same time constant. The level goes from 0 to 100% of its final value, the slope goes from 100% to 0% of its initial value.

The slope of the measured signal comprises the slope of the background signal (estimated here above) and the slope of the desired signal which is for example maximum 10% of the slope of the background signal (see the last column in the table below).

Based on these equations the following table can be made:

| time t | level (AB) | slope | slope + 10% |
|--------|-----------|-------|-------------|
| 0 | 0% | 100% | 110% |
| 1 × τ | 63% | 37% | 47% |
| 2 × τ | 86% | 14% | 24% |
| 3 × τ | 95% | 5% | 15% |
| 4 × τ | 98% | 2% | 12% |

From this table it can be seen that if the slope of the measured signal has dropped below 24%, the level of the background is above 86%.

In alternative embodiments of the present disclosure the processor 140 is configured to trigger the start of bleaching before the desired signal is saturated (e.g. before 50% of the saturation level of the desired signal is reached or even before 30% of the saturation level is reached or even before 10% of the desired saturation level is reached).

In yet alternative embodiments of the present disclosure, the processor 140 is configured to trigger the start of bleaching after a predetermined time period has elapsed since the sample containing targets is brought into contact with the affinity probes. This predetermined period in time may be determined by calibration. In embodiments of the present disclosure this calibration may be done during product development. In embodiments of the present disclosure it may be done at the time of use. The predetermined period is dependent on the kinetics of the binding actions. For the background signal, it depends mostly on the concentration of the background molecules (e.g. large in a blood or plasma sample). A large concentration of background molecules results in a short saturation time. The predetermined period may be determined such that it is suitable for different concentrations of background molecules. This may be done either during the development of the device or during the measurement protocol. The optimal trigger moment is a trade-off between the saturation of the background signal (which is may be as fast as possible) and the build-up of the desired signal. This moment is depending on the time constant of the desired signal (and thus on the luminescent targets) and on the time constant of the background signal (and thus on the background sources). In embodiments of the present disclosure the moment may be pre-selected such that the largest noise reduction is obtained. In embodiments of the present disclosure the moment in time to start bleaching may be defined experimentally (e.g. by calibration measurements).

In embodiments of the present disclosure the bleaching is stopped as soon as the measurement signal after bleaching has dropped to a percentage of the earlier measurement signal (e.g. below 40% of the earlier signal, or even below 20%, or even below 10% of the earlier measurement signal). The moment to stop bleaching may be calibrated. It is a trade-off between keeping the number of remaining luminescent targets as high as possible and decreasing the noise as much as possible. The calibration may be done such that the highest signal to noise ratio can be obtained.

In embodiments of the present disclosure the processor 140 is configured to trigger the light source 111 for exciting the remaining luminescent targets. These are the targets which are not bleached but which only enter the volume where bleaching may occur, after the bleaching has actually taken place.

In embodiments of the present disclosure the processor 140 is configured to trigger the detector 120 for detecting the luminescence signal of the remaining luminescent targets. By quantifying the remaining luminescent targets, the concentration of luminescent targets can be estimated.

The concentration of luminescent targets may be estimated:

Based on the remaining measured signal after the bleaching, thereby ignoring the small fraction of targets which is bleached (the bleaching moment can be taken early because of the slower build-up of the desired signal in comparison to the build-up of the background).

Based on calibration measurements wherein the remaining measurement signal after bleaching is calibrated as a function of concentration. The calibration results in a dose-response (remaining measurement signal) curve.

Based on the slope of the remaining measured signal. This slope changes only very little if the time constant of the desired signal is very long. The time constant of the signal itself can for example be $\tau=100$ min or more, so the slope after t=1 min=0.01×τ, or 2 min=0.02×τ, or 3 min=0.03×τ, is 99%, 98%, 97%.

In embodiments of the present selective bleaching is applied. Thereby the luminescent targets are less bleached than the autofluorescent background generating molecules. The labels may for example be much more robust against bleaching than the autofluorescent background (depends e.g. on the chemical properties of the molecules, stability, nature of excited states, lifetime of excited states), or a bleaching method may be used to which the labels are less sensitive (e.g. a wavelength that is not absorbed by/does not excite the labels but does excite the background. In the last case the absorption spectra of the labels should be different from the absorption spectra of the background generating molecules.

In embodiments of the present disclosure the bleaching device (not shown) is a light source adapted for generating a high intensity pulse causing bleaching of at least part of the sources generating the background signal. In embodiments of the present disclosure the high intensity pulse destroys the luminophores, e.g. fluorophores, which are present. The pulse intensities may for example vary between 1 W/cm$^2$ and 10000 W/cm$^2$, they may for example be: 1 W/cm$^2$, 10 W/cm$^2$, 100 W/cm$^2$, 1000 W/cm$^2$, 10000 W/cm$^2$. The pulse widths may for example vary between 1 ms and 1 min, they may for example be: 1 ms, 10 ms, 100 ms, 1 s, 10 s, 1 min. A photobleaching pulse (not shown) may be applied from the top or from the bottom (in this case the substrate 160 should be transparent). A photobleaching pulse may also be applied via the evanescent field generating structure 110.

In embodiments of the present disclosure, the intensity of the light source 111 can be varied. In example embodiments of the present disclosure, the light source can be used to excite the luminescent targets as well as to bleach the luminescent targets and at least part of the sources generating the background signal. In embodiments of the present disclosure the intensity can be varied by varying the amplitude of the exciting signal. In embodiments of the present disclosure the intensity can be varied by varying the duty cycle. The light source may for example be a bright source that is only intermittently generating a signal:

during a small fraction of the time for measuring, during a large fraction of the time for bleaching.

In embodiments of the present disclosure, the processor 140 controls the intensity of the light source 111 by controlling the amplitude and/or the time or duty cycle of the excitation signal.

In embodiments of the present disclosure the desired bleaching time is obtained by consulting datasheets of the various luminescent molecules and centres or by doing calibration measurements. The desired bleaching time can for example be obtained from known properties such as photostability or chemical stability of the various luminescent molecules and centres. In embodiments of the present disclosure the background signal may be measured on a reference channel in which no luminescent targets are present.

In embodiments of the present disclosure the luminescent targets reside in a liquid. In embodiments of the present disclosure bleaching is applied by modifying the pH of the liquid. The pH of the liquid can for example be modified by mixing the liquid with another liquid, for instance a buffer fluid, having another pH value.

In embodiments of the present disclosure the luminescent targets reside in a liquid. In embodiments of the present disclosure bleaching is applied by modifying the amount of or by introducing reactive oxygen species (ROS) or other radicals or hydrogen peroxide $H_2O_2$ or other aggressive species in the liquid. The pH of the liquid can for example be modified by mixing the liquid with another liquid, for instance a buffer fluid, having another pH value.

In embodiments of the present disclosure, the sources generating the background signal are the fixed luminescent centres in the transducer, the substrate, the assembly which are present from the start of the measurement. On top thereof, there are also the non-specifically bound luminescent molecules.

In embodiments of the present disclosure, the sources generating the background signal are the fixed luminescent centres in the transducer, the substrate, the assembly which are present from the start of the measurement. On top thereof, there are also the non-specifically bound luminescent molecules.

The non-specifically bound fluorescent molecules may have a different time dependence compared to the specific binding. They may for example already have been saturating before the specific molecules and labels arrive (the luminescent targets) (e.g. a blocking solution that is sent over the sensor before the actual sample). Moreover the kinetic parameters such as on-rate and off-rate constants $k_{on}$ and $k_{off}$ may be different and the concentrations of the specific and the non-specific molecule may be different. In embodiments of the present disclosure the target, which is present in low concentration, will connect with the first antibodies at a slow rate and therefore the luminescence intensity caused by the labels connected to the second antibody (the desired signal) will increase more slowly than the background signal because the non-specific bound molecules are present in a much higher concentration. FIG. 6 shows the intensity in function of time of the background signal 620 and of the desired signal 610. The background signal 620 is saturating faster than the desired signal. The solid lines 610, 620 represent the total amount of immobilized molecules (only those molecules that start off as fluorescent are plotted; the non-fluorescent molecules never contribute to the signal). The shaded regions 630, 640 represent the immobilized molecules that are still fluorescent after a given time. (Without bleaching, the lines and shaded regions coincide).

Figure 7:
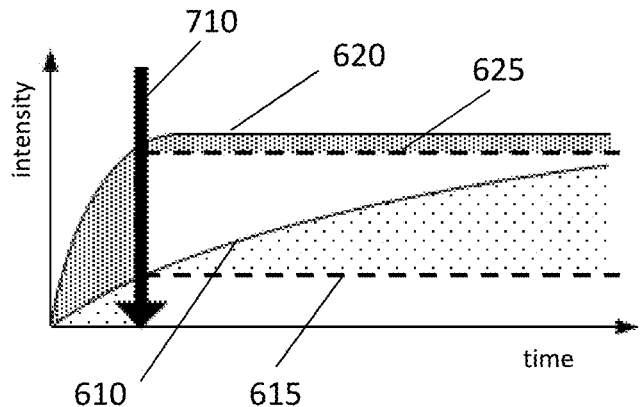
FIG. 7 shows the intensity in function of time of the desired signal and of the measured signal measured in a sensor device in accordance with example embodiments, wherein a bleaching step is applied.

FIG. 7 illustrates what happens when applying a bleaching pulse 710, such as a high-intensity excitation pulse or a pH pulse or an ROS pulse, after a significant fraction of the faster background signals have built up. After the bleaching, the remaining luminescent targets (which are not bleached, e.g. because they were outside the bleaching region) will continue to connect with the first antibodies and the desired luminescence signal will continue to build up. The fixed centres in the transducer/substrate/assembly are destroyed by the bleaching and will not build up again. Also the non-specifically bound fluorescent molecules are destroyed. Thereby the background signal is decreased. The bleaching pulse, however, does not affect fluorescent centres in solution that are outside the bleaching region (e.g. not in the optical beam, or not in the pH or ROS pulse): the flow will replace bleached molecules in the bleaching region by non-bleached molecules, hence a background signal will continue to be present, albeit to a lesser extent. This way, the signal to noise ratio of a measured signal is increased.

Figure 21:
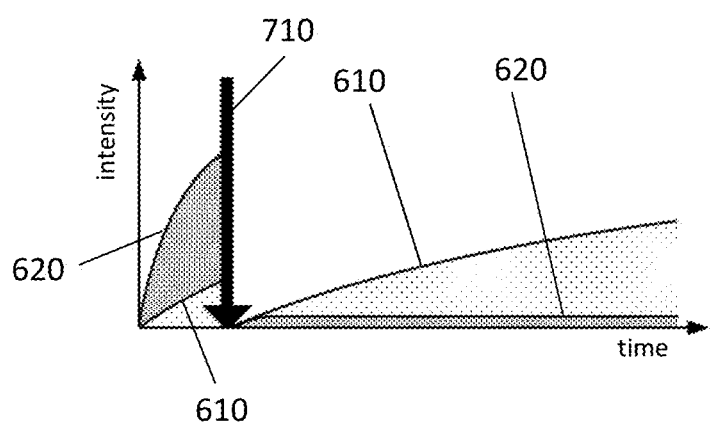
FIG. 21 shows the intensity in function of time of the desired signal and of the background signal measured in a sensor device in accordance with example embodiments, wherein a bleaching step is applied.

FIG. 7 shows the intensity in function of time of the background signal and of the desired signal. The total number of immobilized target and background molecules is still the same as shown in FIG. 6. However, the molecules that were present at the time of bleaching become non-fluorescent, and the fluorescent fraction consists only of the molecules that are immobilized after the bleaching event. In other words, the shaded region starts only above the level of immobilization at the bleaching time. In FIG. 7 this is represented by shifted zero-lines 615 for the desired signal 610, and 625 for the background signal 620. The same graph, but with zero-lines shifted back to the horizontal axis, is shown in FIG. 21. (The solid lines now no longer represent the total amount of immobilized molecules, but only the fluorescent fraction).

Figure 22:
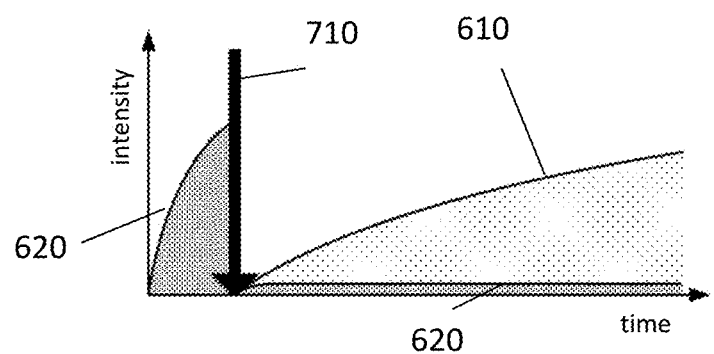
FIG. 22 shows the intensity in function of time of the desired signal and of the background signal measured in a sensor device in accordance with example embodiments wherein a bleaching step is applied and wherein the targets are only added after the bleaching.

FIG. 22 shows the intensity in function of time of the background signal 620 and of the desired signal 610 when the surface 190 is first exposed to a blocking material or buffer (e.g. BSA) to start building up/to saturate the non-specific bindings, after which a bleaching step is applied, and after which the surface 190 is exposed to the sample. (FIG. 6 uses the same plotting conventions as FIG. 21).

An onset of the bleaching pulse, e.g. the high intensity pulse of the pH pulse, is indicated by the arrow 710. The bleaching pulse destroys the luminescent signal of both the faster and slower molecules that have already been immobilized. Since the background signal 620 was already almost saturated at the moment of the high-intensity pulse 710 compared to the desired signal 610 emanating from the luminescent targets, the desired signal 610 will build up more after the bleaching pulse than the background signal 620 does. It is to be noted, as stated above, that the bleaching step does not affect the luminescent centres in the solution that still have to pass or diffuse through the region of the sensor device 100 that is affected by the bleaching action. The flow will replace these by non-bleached molecules.

In embodiments of the present disclosure luminescent targets enter the device through diffusion and/or convection. The luminescent targets entering device after bleaching are themselves not bleached. They therefore can contribute to the desired signal. In embodiments of the present disclosure these luminescent targets are bound to the free affinity probes on the surface 190.

In embodiments of the present disclosure the sensor device 100 may have a separate channel for doing background measurements. In this channel no luminescent targets are present.

In embodiments of the present disclosure the measured pattern is taken as reference pattern for itself. In these embodiments of the present disclosure the correlation done by the processor is an autocorrelation in the space domain. In embodiments of the present disclosure the reference pattern is a recorded pattern. In embodiments of the present disclosure a measured pattern can be correlated with a time series of recorded patterns resulting in an autocorrelation in the time domain. In example embodiments of the present disclosure, from the autocorrelation the magnitude of fluctuations in the measurement and thus of the noise level can be derived. In example embodiments of the present disclosure, transient phenomena can be identified and removed from the measured signal, thereby decreasing the background signal (or noise level). In embodiments of the present disclosure the desired pattern is periodically modulated in time or is spatially modulated wherein a periodic pattern is present in the surface 190 on which the luminescent targets may bind. Periodic time modulation can be done by periodically altering a physical parameter (e.g. by modulating the light source which is exciting the luminescent targets). In example embodiments of the present disclosure, using autocorrelation in the time domain, the contribution of background signals which are not affected by the modulation (e.g. the dark current or the read noise of the detector) can be reduced. A spatial periodicity in the desired pattern can be realized by providing a binding pattern on the surface of the sensor device (e.g. by arranging the spots for specific binding of the luminescent targets in a regular pattern). In case of periodical spatial modulation, the autocorrelation peaks with an offset (or spatial frequency) corresponding to the period of this pattern are representative for the desired signal, since background signals do not give a peak at this special frequency. The spatial modulation and autocorrelation can be done in one or two dimensions.

Figure 8:
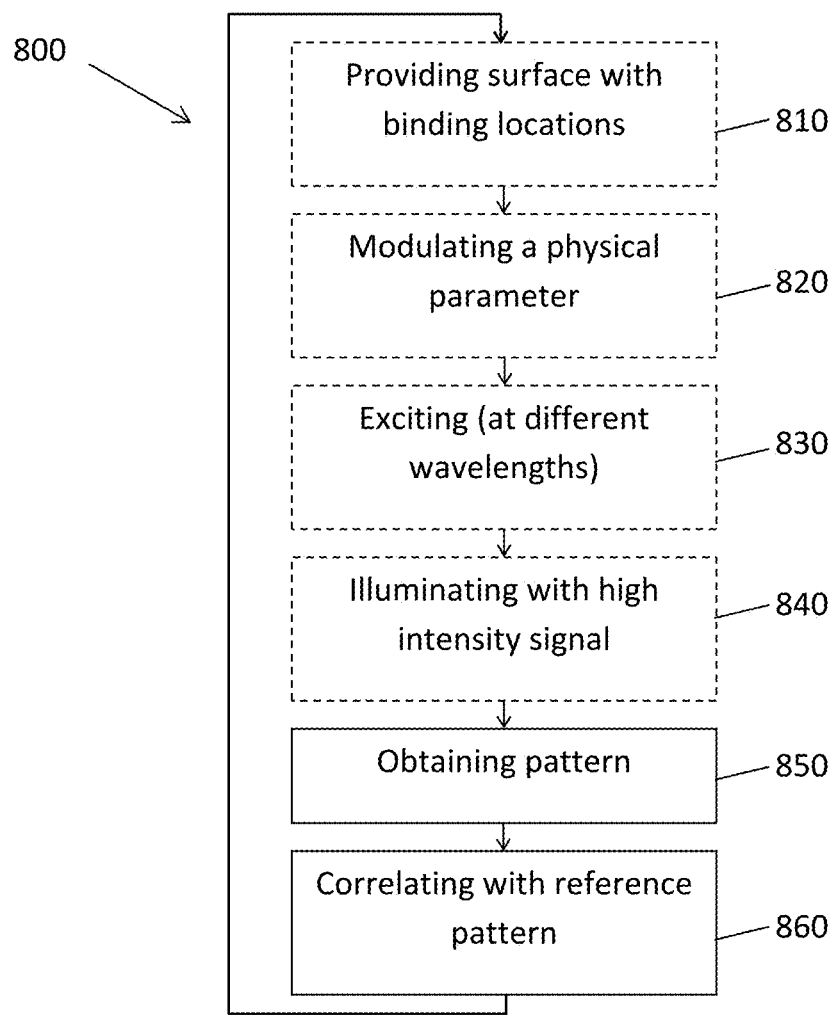
FIG. 8 shows a flow chart of method steps for quantifying luminescent targets configured in an at least one dimensional pattern in accordance with example embodiments.

In a second aspect the present disclosure provides a method for quantifying luminescent targets configured in an at least one dimensional pattern. A flow chart illustrating the different steps of this method is shown in FIG. 8. The steps which are displayed in dotted lines are optional. Although the different steps are depicted in a specific order, this is not the only possible order, and methods having the same steps in a different order also form embodiments of the present disclosure. The method comprises a step 850 wherein an at least one dimensional pattern of signals is obtained using a detector. This detector can detect the luminescence of the luminescent targets. The obtained pattern can be stored to be used as a reference pattern later on. In that case it becomes a recorded pattern. By correlating 860 the measured pattern with at least one reference pattern the signal to noise ratio is increased. The reference pattern can be a recorded pattern or an expected pattern. These measurements and correlations may be done at regular time intervals. This allows for example to distinguish background luminescence sources from luminescence coming from the target based on the decay time of both luminescence sources.

The method 800 may include a step 810 providing a surface on which a pattern of binding locations for the luminescent targets is provided. From this pattern the expected pattern can be derived.

The method 800 may include a step 820 wherein a physical parameter is modulated, resulting in a modulation of the desired signals which is different from the modulation of the background signals. This modulation may then be taken into account in the correlating step 860.

The method 800 may comprise exciting 830 the luminescent targets at different wavelengths and taking into account the difference in response, of the luminescent targets and/or of the background on the exciting frequencies, in the correlation step 860. The detection may be done at different or at the same wavelengths.

The method 800 may comprise a bleaching step 840. The bleaching may be done by illuminating 840 the luminescent targets with a high intensity pulse. After the bleaching step the background level is decreased. After the bleaching step, a reference pattern may be measured 850, after which an excitation step 830 may be applied. After the excitation step the luminescence of the remaining luminescent targets may be measured 850.

Bleaching may comprise a first step wherein a sample or blocking material is injected in the device 100. In embodiments of the present disclosure thereby the surface 190 is exposed to the sample or to the blocking material. In embodiments of the present disclosure the surface 190 is exposed to a blocking material or buffer (e.g. BSA) to start building up/to saturate the non-specific bindings. In this case the sample is injected after the bleaching. The time in for example FIG. 7 starts running when the injection of the sample starts. The time in FIG. 22 starts running when the injection of the blocking material starts. A waiting interval may be present after the first step for the bindings to complete.

In a next optional step, after the first step, the sample/blocking material is excited and luminescence signals are measured. These luminescence signals may be fluorescent photons which are emitted within a few ns (typically 1-5 ns) after an excitation photon has been absorbed. In this optional step the measured signal is analysed to decide whether to start the bleaching. Measuring and analyzing is repeated until it is decided to start bleaching.

Alternatively, a predetermined time may be used after which the bleaching is started.

The bleaching step may last during a predetermined time period. Alternatively, the bleaching step may comprise an optional feedback loop wherein a luminescence signal is measured (excitation and measuring) and analysed, and wherein the intensity level after bleaching is compared with the intensity level before bleaching. When the intensity level crosses a first threshold, e.g. 40% of the intensity level before bleaching, the bleaching is stopped; if not, bleaching is continued, and the signal is measured and analysed again.

The bleaching step may be followed by an optional sample injection step. This step is executed when in the first step blocking material was injected instead of the sample. After injecting the sample a waiting interval may be applied such that for example the luminescent targets can bind to the surface 190.

In embodiments of the present disclosure the bleaching step is followed by a measurement step in which the sample is excited and luminescence signals are measured. The luminescence signals may be measured once, more than once, or continuously. The luminescence measurement signal is thereby determined with an increased signal to noise ratio.

Sensor devices 100 according to embodiments of the present disclosure may be used in bioreactors. Bioreactors are, for example, used in the pharmaceutical industry, in food and agriculture (e.g. beer), in cell and tissue culturing (e.g. stem cells, regenerative medicine). In those cases, (affinity-based) (bio)sensor devices 100, according to the present disclosure, can be used to monitor if the culture is performing fine (e.g. check nutrients, measure the concentration of a product the culture is fabricating, check for contaminations).

The invention claimed is:

1. A sensor device for quantifying luminescent targets configured in an at least one dimensional pattern, the sensor device comprising:
   a detector for obtaining an at least one-dimensional pattern of measured signals, wherein the detector is adapted for detecting a luminescence of the luminescent targets, resulting in a measured pattern;
   a processor configured to correlate the measured pattern with at least one reference pattern so as to generate a measurement signal representative for quantification of the luminescent targets, wherein the at least one reference pattern is an expected pattern or a recorded pattern obtained by the detector before the measured pattern is obtained;
   a light source for exciting the luminescent targets, thus generating luminescence signals; and
   a bleaching device comprising a second light source adapted for generating a high intensity pulse for bleaching of at least part of sources generating a background signal,
   wherein a desired signal is part of the pattern of measured signals that is originating from the luminescent targets,
   wherein the background signal is different from the desired signal in the pattern of measured signals,
   wherein the processor is configured to trigger the bleaching device to start bleaching at a moment in time after substantial saturation of the background signal and before saturation of the desired signal and to trigger the light source for exciting remaining luminescent targets, and
   wherein the remaining luminescent targets are those targets which are not bleached, and to trigger the detector for detecting the luminescence signal of the remaining luminescent targets, so as to generate a measurement signal representative for quantification of the luminescent targets.

2. The sensor device according to claim 1, further comprising a surface for binding the luminescent targets, wherein the surface is designed such that the luminescent targets bind on a location of the surface corresponding with an at least one-dimensional binding pattern, and wherein the at least one reference pattern is the at least one-dimensional binding pattern of the surface.

3. The sensor device according to claim 1, further comprising:
   a surface or a three dimensional volume for binding the luminescent targets;
   an evanescent field generating structure, wherein a light source is coupled to the evanescent field generating structure, and wherein the evanescent field generating structure is adapted for generating an evanescent field at the surface or in the three dimensional volume.

4. The sensor device according to claim 1, wherein the processor is configured to correlate subsections of the measured pattern with subsections of the reference pattern.

5. The sensor device according to claim 1,
   wherein the sensor device comprises a modulator which is configured to modulate a physical parameter, resulting in modulation of a desired signal that is different from the modulation of a background signal,
   wherein the desired signal is this part of the pattern of measured signals that is originating from the luminescent targets, and
   wherein the background signal is different from the desired signal in the pattern of measured signals, wherein the processor is configured to correlate, while taking into account the modulation of the physical parameter, the measured pattern with the at least one reference pattern recorded at a different time instance than the measured pattern.

6. The sensor device according to claim 1, further comprising a light source configured to excite the luminescent targets at two different wavelengths, wherein the recorded pattern is obtained when exciting at one wavelength, and wherein the measured pattern is obtained when exciting at another wavelength.

7. A diagnostic device comprising
   the sensor device according to claim 1 for sensing an analyte and generating a measurement signal representative for quantification of the analyte; and
   an output unit for providing an output of said sensor device on which a diagnosis can be based.

8. The diagnostic device according to claim 7, wherein the output unit is adapted for outputting a signal representative for presence/absence or concentration of the analyte.

* * * * *